US008564663B2

(12) United States Patent
Plemons et al.

(10) Patent No.: US 8,564,663 B2
(45) Date of Patent: Oct. 22, 2013

(54) VEHICLE-MOUNTABLE IMAGING SYSTEMS AND METHODS

(75) Inventors: Danny Plemons, Austin, TX (US);
David K. Breakfield, Austin, TX (US);
David Moore, Maidstone (GB); Gary Morris, Dripping Springs, TX (US);
Charlie Pybus, Round Rock, TX (US)

(73) Assignees: BAE Systems Information and Electronic Systems Integration Inc., Nashua, NH (US); BAE Systems PLC, London (GB)

( * ) Notice: Subject to any disclaimer, the term of this patent is extended or adjusted under 35 U.S.C. 154(b) by 764 days.

(21) Appl. No.: 12/423,194

(22) Filed: Apr. 14, 2009

(65) Prior Publication Data

US 2010/0295945 A1  Nov. 25, 2010

(51) Int. Cl.
*H04N 7/18* (2006.01)

(52) U.S. Cl.
USPC .......................................... 348/148; 348/143

(58) Field of Classification Search
USPC ........................................................ 348/148
See application file for complete search history.

(56) References Cited

U.S. PATENT DOCUMENTS

| 7,084,904 | B2 | 8/2006 | Liu et al. ..................... 348/218.1 |
| 7,619,626 | B2 | 11/2009 | Bernier .......................... 345/629 |
| 2002/0015536 | A1* | 2/2002 | Warren et al. ................. 382/284 |
| 2004/0061787 | A1* | 4/2004 | Liu et al. ..................... 348/218.1 |
| 2004/0169663 | A1* | 9/2004 | Bernier .......................... 345/629 |
| 2005/0265633 | A1 | 12/2005 | Piacentino et al. |
| 2007/0097206 | A1* | 5/2007 | Houvener et al. ............... 348/26 |
| 2008/0079554 | A1* | 4/2008 | Boice ............................. 340/436 |

FOREIGN PATENT DOCUMENTS

WO   WO 2008/048370 A2   4/2008

OTHER PUBLICATIONS

International Search Report and Written Opinion, issued in International Application No. PCT/US2010/030793, dated Jun. 29, 2010.
Extended Search Report dated May 23, 2013 for PCT/US2010/030793.

* cited by examiner

*Primary Examiner* — Shirley Zhang
*Assistant Examiner* — Angela Nguyen
(74) *Attorney, Agent, or Firm* — Fulbright & Jaworski LLP

(57) ABSTRACT

Imaging systems, methods, sensor pods, and vehicles having imaging systems. An imaging system can be coupled to a vehicle and can comprise: a plurality of imaging sensors with multiple spectrums; and a processing unit configured to generate an image model in substantially real-time by: warping, fusing, and stitching images; and two or more displays coupled to the processing unit such that the two or more displays can simultaneously each show a different portion of the image model, and such that a user can manually calibrate via the processing unit at least one of the warping, fusing, or stitching. In some imaging systems, imaging sensors are coupled at different elevations relative to a ground vehicle. The present sensor pods can comprise a housing; two or more first imaging sensors having a first spectrum; and two or more second imaging sensors having a second spectrum that is different than the first spectrum.

22 Claims, 27 Drawing Sheets

VEHICLE-MOUNTABLE IMAGING SYSTEMS AND METHODS

BACKGROUND

1. Field of the Invention

The present invention relates generally to situational awareness (SA) sensors, and, more particularly, but not by way of limitation, to situational awareness sensors configured for use with vehicles such as military vehicles.

2. Description of Related Art

A number of situational awareness devices and systems have been developed and/or are in use in the art, such as, for example, the Check-6™ and/or the Fused Vision systems manufactured by BAE Systems, which has numerous offices and other facilities in the United States and worldwide.

The following reference may include an example or examples of situational-awareness devices and systems, and may facilitate an understanding of background information and possible application-specific information for this and related fields of endeavor: International Application No. PCT/US2007/008070, filed Apr. 3, 2007, and published as WO 2008/048370, which is incorporated by reference in its entirety.

SUMMARY OF THE INVENTION

Close-in, real-time, 360° situational awareness on a range of current force vehicle platforms (vehicle platforms that do not offer unimpeded direct vision operation) can be beneficial to soldiers "mounted" on or in such vehicle platforms. Combat vehicles can more-effectively protect vehicle operators and occupants if such combat vehicles have the ability to operate in "closed-hatch" mode during urban conflicts and peacekeeping missions. Situational awareness for vehicles in closed-hatch mode can be addressed through the application of a multi-spectral, all weather vision system that provides near real-time imagery from the immediate platform vicinity, out to hundreds or thousands of meters away. Some embodiments of the present situational awareness systems include an array of above armor sensor pods, centralized (or distributed) below-armor video processing, and independent video distribution to three operator stations within the vehicle.

Multi-spectral imaging devices can be utilized in combination with image processing hardware and methods to extend situational awareness and support the functionality of vehicles (e.g., armored vehicles) during "closed-hatch" operations. Uncooled IR microbolometers can be incorporated for day/night vehicle indirect vision systems.

The present disclosure includes various embodiments of imaging systems, methods, and vehicles having imaging systems.

Some embodiments of the present imaging systems are suitable for use with, configured for use with, or otherwise usable with a vehicle.

Some embodiments of the present imaging systems comprise: a plurality of first imaging sensors having a first spectrum, each first sensor having a field-of-view (FOV) and configured to be coupled to a vehicle such that the FOV partially overlaps the FOV of at least one of the other first imaging sensors; a plurality of second imaging sensors having a second spectrum, each second sensor having a FOV and configured to be coupled to the vehicle such that the FOV is substantially aligned with the FOV of a corresponding first imaging sensor; a processing unit configured to receive images from the first and second imaging sensors and to generate an image model in substantially real-time by: (a) warping images from corresponding first and second imaging sensors; (b) fusing images from corresponding first and second imaging sensors; and (c) stitching images from imaging sensors with partially overlapping FOVs; and where the processing unit is configured to be coupled to two or more displays such that the two or more displays can simultaneously each show a different portion of the image model.

In some embodiments of the present imaging systems, the processing unit is configured to generate an image model by fusing images with an alpha-blending algorithm. In some embodiments, the processing unit is configured to generate an image model by warping images with one or more predefined warping templates each corresponding to an imaging sensor. In some embodiments, the processing unit is configured to generate an image model by fusing images with one or more predefined stitching templates.

In some embodiments of the present imaging systems, the first imaging sensors are long-wavelength infrared (LWIR) imaging sensors. In some embodiments, the second imaging sensors are color daylight (CD) imaging sensors. In some embodiments, the image model comprises images covering at least a continuous 180 degrees around the vehicle. In some embodiments, the image model comprises images covering a continuous 360 degrees around the vehicle. In some embodiments, at least one of the first imaging sensors and the second imaging sensors are analog, and where the processing unit is further configured to convert analog images to digital images prior to generating the image model.

In some embodiments of the present imaging systems, the imaging system is configured such that, if the processing unit is coupled to a display, the display can simultaneously show two or more different portions of the image model. In some embodiments, the imaging system is configured such that, if the processing unit is coupled to a display, the display can simultaneously show a front portion of an image model including images of in front of the vehicle and a mirrored rear portion of an image model including images of behind the vehicle. In some embodiments, the imaging system is configured such that, if the processing unit is coupled to the display, the display can also simultaneously show two side portions of an image model, each side portion including images from a different side of the vehicle. In some embodiments, the imaging system is further configured such that, if the processing unit is coupled to the display, the display can also show a reference indicator indicative of the orientation of the portion of the image model shown on the display relative to the orientation of the vehicle.

In some embodiments of the present imaging systems, the processing unit comprises one or more graphics processors. In some embodiments, the processing unit is configured to be coupled to two or more user-input devices each corresponding to a different display. In some embodiments, the processing unit is configured to be coupled to at least one user-input device that is integral to a corresponding display. In some embodiments, the imaging system is configured such that, if the processing unit is coupled to a display and a corresponding user-input device, a user can adjust, via the user-input device, the intensity of images from the first imaging sensors relative to the intensity of fused images from the second imaging sensors in a portion of the image model shown on the display.

Some embodiments of the present imaging systems further comprise a wireless communication device coupled to the processing unit and configured to transmit at least a portion of the image model to a remote receiver. In some embodiments, the wireless communication device is further configured to receive signals from a remote user-input device. In some embodiments, the processing unit is further configured to compress at least a portion of the image model prior to the wireless communication device transmitting the at least a portion of the image model to a remote receiver.

Some embodiments of the present vehicles comprise: a ground vehicle; and an imaging system coupled to the vehicle. In some embodiments, the imaging system comprises: a plurality of first imaging sensors having a first spectrum, each first sensor having a field-of-view (FOV) and coupled to the vehicle such that the FOV partially overlaps the FOV of at least one of the other first imaging sensors; a plurality of second imaging sensors having a second spectrum, each second sensor having a FOV and coupled to the vehicle such that the FOV is substantially aligned with the FOV of a corresponding first imaging sensor; a processing unit configured to receive images from the first and second imaging sensors and to generate an image model in substantially real-time by: (a) warping images from corresponding first and second imaging sensors; (b) fusing images from corresponding first and second imaging sensors; and (c) stitching images from imaging sensors with partially overlapping FOVs; and two or more displays coupled to the processing unit; where the imaging system is configured such that the two or more displays can simultaneously each show a different portion of the image model.

In some embodiments of the present vehicles, the processing unit is configured to generate an image model by fusing images with an alpha-blending algorithm. In some embodiments, the processing unit is configured to generate an image model by warping images with one or more predefined warping templates each corresponding to an imaging sensor. In some embodiments, the processing unit is configured to generate an image model by fusing images with one or more predefined stitching templates.

In some embodiments of the present vehicles, the first imaging sensors are long-wavelength infrared (LWIR) imaging sensors. In some embodiments, the second imaging sensors are color daylight (CD) imaging sensors. In some embodiments, the image model comprises images covering at least a continuous 180 degrees around the vehicle. In some embodiments, the image model comprises images covering a continuous 360 degrees around the vehicle. In some embodiments, at least one of the first imaging sensors and the second imaging sensors are analog, and where the processing unit is further configured to convert analog images to digital images prior to generating the image model.

In some embodiments of the present vehicles, the imaging system is configured such that at least one display can simultaneously show two or more different portions of the image model. In some embodiments, the imaging system is configured such that the at least one display can simultaneously show a front portion of an image model including images of in front of the vehicle and a mirrored rear portion of an image model including images of behind the vehicle. In some embodiments, imaging system is configured such that the at least one display can also simultaneously show two side portions of an image model, each side portion including images from a different side of the vehicle. In some embodiments, the imaging system is further configured such that at least one of the two or more displays can also show a reference indicator indicative of the orientation of the portion of the image model shown on the display relative to the orientation of the vehicle.

In some embodiments of the present vehicles, the processing unit comprises one or more video cards. In some embodiments, the imaging system further comprises two or more user-input devices each coupled to a different display. In some embodiments, at least one user-input device is integral to the coupled display. In some embodiments, the user-input device is further configured to be operable by a user to adjust the intensity of images from the first imaging sensors relative to the intensity of fused images from the second imaging sensors in the portion of the image model shown on the coupled display.

Some embodiments of the present vehicles further comprise a wireless communication device coupled to the processing unit and configured to transmit at least a portion of the image model to a remote receiver. In some embodiments, the wireless communication device is further configured to receive signals from a remote user-input device. In some embodiments, the processing unit is further configured to compress at least a portion of the image model prior to the wireless communication device transmitting the at least a portion of the image to a remote receiver.

In some embodiments of the present vehicles, the ground vehicle is selected from the group consisting of: M1117 Guardian Armored Security Vehicles (ASVs), High Mobility Multipurpose Wheeled Vehicles (Humvee), Family of Medium Tactical Vehicles (FMTV), Light Medium Tactical Vehicles (LMTV), Medium Tactical Vehicles (MTV), Medium Tactical Vehicle Replacements (MTVR), Heavy Expanded Mobility Tactical Trucks (HEMTT), Heavy Equipment Transport Systems (HETS), Palletized Load System (PLS) vehicles, and Bradley Fighting Vehicles.

Some embodiments of the present imaging systems comprise: two imaging sensors, each having a field-of-view (FOV) and configured to be coupled to a vehicle such that the FOV is spaced by a distance from the FOV of the other imaging sensor; and a processing unit configured to receive images from the imaging sensors; where the processing unit is configured to be coupled to a display such that the display can show simultaneously a portion of images from each imaging sensor such that the portions are spaced apart by a distance that is proportional to the distance between the FOVs of the imaging sensors. In some embodiments, the two imaging sensors are each coupled to a ground vehicle such that the FOV is spaced by a distance from the FOV of the other imaging sensor, and the imaging system further comprises: a display coupled to the processing unit such that the display can show simultaneously a portion of images from each imaging sensor such that the portions are spaced apart by a distance that is proportional to the distance between the FOVs of the imaging sensors.

Some embodiments of the present sensor pods comprise a housing; a first imaging sensor having a first spectrum and coupled to the housing; a second imaging sensor having a second spectrum and a field-of-view (FOV), the second imaging sensor coupled to the housing in fixed relation to the first imaging sensor such the FOV of the second imaging sensor is substantially aligned with the FOV of the first imaging sensor; and a processing unit disposed within the housing, the graphics processor configured to receive images from the first and second imaging sensors and to generate an image model in substantially real-time by fusing images from the first and second imaging sensors.

Some embodiments of the present sensor pods comprise: a housing; two imaging sensors, each having a field-of-view (FOV) and coupled in fixed relation to the housing such that the FOV partially overlaps the FOV of the other sensor; and a processing unit disposed within the housing, the graphics processor configured to receive images from the first and second imaging sensors and to generate an image model in substantially real-time by warping and stitching images from the first and second imaging sensors.

Some embodiments of the present sensor pods comprise: a housing; two or more first imaging sensors having a first spectrum, each first imaging sensor having a field-of-view (FOV) and coupled in fixed relation to the housing such that the FOV partially overlaps the FOV of the other sensor; and two or more second imaging sensors having a second spectrum, each second sensor having a FOV and coupled to the vehicle such that the FOV is substantially aligned with the FOV of a corresponding first imaging sensor. In some embodiments, the sensor pod further comprises a processing unit configured to receive images from the first and second imaging sensors and to generate an image model in substantially real-time by: (a) warping images from corresponding first and second imaging sensors; (b) fusing images from corresponding first and second imaging sensors; and (c) stitching images from imaging sensors with partially overlapping FOVs.

Some embodiments of the present imaging systems comprise: two imaging sensors, each imaging sensor having a field-of-view (FOV) and configured to be coupled to a vehicle such that the FOV partially overlaps the FOV of the other imaging sensor; and a processing unit configured to receive images from the imaging sensors and to generate an image model in substantially real-time by warping and stitching images from the imaging sensors; where the processing unit is configured to be coupled to two or more displays such that the two or more displays can simultaneously each show a different portion of the image model. Some embodiments of the present imaging systems comprise: a ground vehicle; and an imaging system coupled to the vehicle. The imaging system can comprise: two imaging sensors, each imaging sensor having a field-of-view (FOV) and coupled to the vehicle such that the FOV partially overlaps the FOV of the other first imaging sensor; a processing unit configured to receive images from the imaging sensors and to generate an image model in substantially real-time by warping and stitching images from the imaging sensors; and two or more displays coupled to the processing unit; where the imaging system is configured such that the two or more displays can simultaneously each show a different portion of the image model.

Any embodiment of any of the present systems, vehicles, pods, and methods can consist of or consist essentially of—rather than comprise/include/contain/have—any of the elements, features, and/or steps. Thus, in any of the claims, the term "consisting of" or "consisting essentially of" can be substituted for any of the open-ended linking verbs recited above, in order to change the scope of a given claim from what it would otherwise be using the open-ended linking verb.

Details associated with the embodiments described above and others are presented below.

BRIEF DESCRIPTION OF THE DRAWINGS

The following drawings illustrate by way of example and not limitation. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as may non-identical reference numbers.

DESCRIPTION OF ILLUSTRATIVE EMBODIMENTS

The term "coupled" is defined as connected, although not necessarily directly, and not necessarily mechanically; two items that are "coupled" may be integral with each other. The terms "a" and "an" are defined as one or more unless this disclosure explicitly requires otherwise. The terms "substantially," "approximately," and "about" are defined as largely but not necessarily wholly what is specified, as understood by a person of ordinary skill in the art.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system that "comprises," "has," "includes" or "contains" one or more elements possesses those one or more elements, but is not limited to possessing only those elements. For example, in an imaging system that comprises an imaging sensor module and a display, the imaging system includes the specified elements but is not limited to having only those elements. For example, such an imaging system could also include a central interface module coupled to the imaging sensor module and the display, such that images are received by the display from the imaging sensor module via the central interface module Likewise, a method that "comprises," "has," "includes" or "contains" one or more steps possesses those one or more steps, but is not limited to possessing only those one or more steps.

Further, a device or structure that is configured in a certain way is configured in at least that way, but it can also be configured in other ways than those specifically described. A device or structure that is configured to be or do something has the capacity to be or do that something but need not (though it may) actually be or do that something. For example, a device or structure that is configured to be connected in a certain way need not actually be connected.

Figure 1:
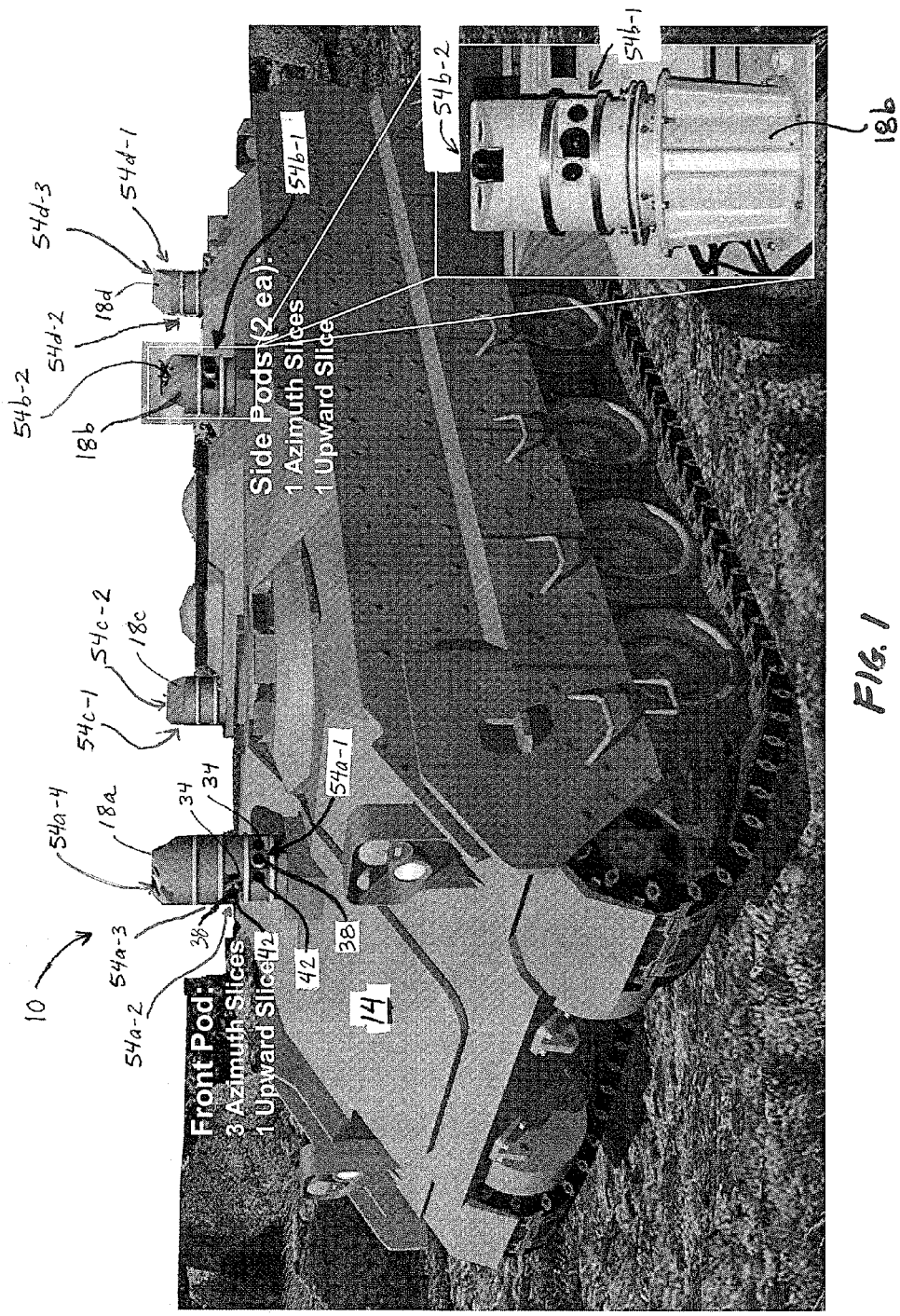
FIG. 1 depicts an embodiment of one of the present imaging systems coupled to a vehicle.
Figure 2:
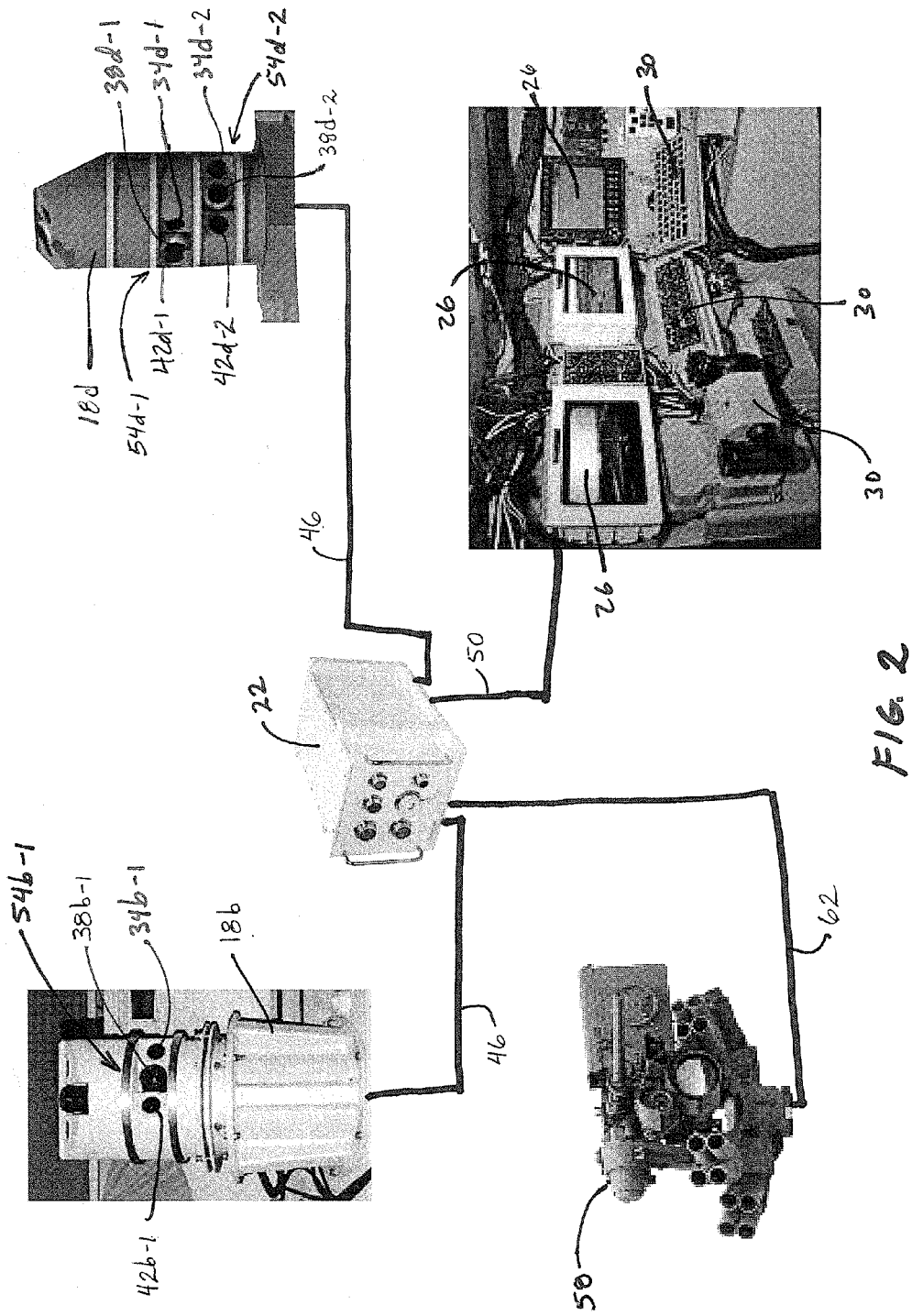
FIG. 2 depicts a diagram view of one of the present imaging systems.

Referring now to the drawings, and more particularly to FIGS. 1 and 2, shown therein and designated by the reference numeral 10 is an embodiment of one of the present imaging systems. Imaging system 10 may be interchangeably referred to herein as system 10. In FIG. 1, system 10 is shown coupled to an armored tracked (e.g., Bradley) vehicle 14. In other embodiments, vehicle 14 can be any suitable vehicle, such as, for example, heavy tactical and/or military vehicles, medium tactical and/or military vehicles, light tactical and/or military vehicles, M1117 Guardian Armored Security Vehicles (ASVs), High Mobility Multipurpose Wheeled Vehicles (Humvee), Family of Medium Tactical Vehicles (FMTV), Light Medium Tactical Vehicles (LMTV), Medium Tactical Vehicles (MTV), Medium Tactical Vehicle Replacements (MTVR), Heavy Expanded Mobility Tactical Trucks (HEMTT), Heavy Equipment Transport Systems (HETS), Palletized Load System (PLS) vehicles, and Bradley Fighting Vehicles.

In the embodiment shown, system 10 comprises a plurality of imaging modules 18, a processing unit 22, a display 26, and a user-input device 30. As shown in FIG. 1, imaging modules 18 comprise an imaging module 18a disposed near the front of the vehicle, imaging modules 18b and 18c disposed near the sides of the vehicle, and imaging module 18d disposed near the rear of the vehicle. In FIG. 2, only two of the four imaging modules are shown for brevity. In other embodiments, any suitable number of imaging modules 18 can be used, and/or sensor pods 18 can be omitted entirely, as discussed in more detail below.

In the embodiment shown, imaging system 10 comprises a plurality of first imaging sensors 34 (e.g., cameras such as video cameras), and a plurality of second imaging sensors 38 (e.g., cameras such as video cameras). The reference numeral 34 is used herein to refer to first imaging sensors in general, and more-specific reference numbers (e.g., 34b-1) are used to refer to specific first imaging sensors. Similarly, the reference numeral 38 is used herein to refer to second imaging sensors in general, and more-specific reference numbers (e.g., 34b-1) are used to refer to specific second imaging sensors. As will be individually appreciated by those of ordinary skill in the art, the imaging sensors are configured to capture images. In some embodiments, the imaging sensors continuously detect light such that they continuously output images (e.g., "moving" images, which can be, for example, a continuously changing image stream, continuously output sequential images, or the like). "Images" are not necessarily required to be of visible light. Instead, an "image" as used herein describes the result of the sensing or collecting electromagnetic wavelengths such as light or emanating thermal energy (e.g., visible, infrared, and/or other wavelengths) to identify landscape or, more generally, one or more items (e.g., objects, people, animals, or the like) that are in the field-of-view (FOV) of an imaging sensor.

In the embodiment shown, the first and second imaging sensors are disposed in (and/or coupled to) imaging modules 18; but in other embodiments, first and second imaging sensors can be coupled to the vehicle 14 in any suitable fashion. First imaging sensors have a first spectrum, such as, for example, infrared (IR), visible near-infrared (VNIR), image intensified ($I^2$), color VNIR, or the like. As will be appreciated individually by those of ordinary skill in the art, each first imaging sensor 34 has a field-of-view (FOV). In the embodiment shown, each first imaging sensor 34 is further configured to be (and, in the embodiment shown, actually is) coupled to a vehicle (e.g., by way of an sensor pod 18) such that the FOV of the first imaging sensor at least (or only) partially overlaps the FOV of at least one of the other first imaging sensors 34. For example, in the embodiment shown, sensor pod 18d comprises two first imaging sensors 34d-1 and 34d-2, each rotated about a common axis (e.g., through the vertical center of sensor pod 18d) relative to one another such that each second imaging sensor has a FOV that partially overlaps the FOV of the other such that the images from the first imaging sensors with partially overlapping fields of view can be stitched together into a larger image, as described in more detail below. By way of another example, the FOV of first imaging sensor 34d-1 may partially overlap the FOV of first imaging sensor 34b-1 such that images from imaging sensors 34d-1 and 34b-1 can also be stitched together.

The plurality of second imaging sensors 38 can have a second spectrum (e.g., different from the first spectrum of first imaging sensors 34) such as, for example, infrared (IR), visible near-infrared (VNIR), image intensified ($I^2$), color VNIR, or the like. As will be appreciated individually by those of ordinary skill in the art, each second sensor 38 has a FOV (which may, for example, have the same or a different size than the FOV of any first imaging sensor). In the embodiment shown, each second imaging sensor is configured to be (and in the embodiment shown, actually is) coupled to the vehicle (e.g., by way of an sensor pod) such that the FOV of the second imaging sensor is substantially aligned with (and substantially entirely overlaps) the FOV of a corresponding first imaging sensor. For example, the FOV of second imaging sensor 38d-1 is substantially aligned (and substantially entirely overlapping) with the FOV of the corresponding first imaging sensor 34d-1.

As used herein, "substantially aligned" does not require perfect alignment. It may be very difficult (if not impossible) to physically align two imaging sensors so perfectly that they have exactly the same field-of-view at all distances. However, by measuring or registering the difference in position of two adjacent imaging sensors (e.g., first imaging sensor 34d-1 and second imaging sensor 38d-1), images from one or both of can be electronically or computationally offset to be aligned with one another. For example, if first and second imaging sensors 34d-1 and 38d-1 are laterally offset by 2 inches (have a parallax difference of 2 inches), then processing unit 22 can be configured (e.g., programmed or the like) to offset the images from one of these two imaging sensors to offset or correct the parallax difference such that the images are aligned sufficiently (even if not perfectly so) that they can be displayed (e.g., by way of a display 26) such that the images from corresponding first and second imaging sensors appear to be substantially aligned to a user viewing the display. In some embodiments, the processing unit is configured to receive an input from a user (e.g., by way of a user-input device) adjusting parallax between images displayed on a display that corresponds to the user-input device.

In this way, the FOVs of first set of corresponding first and second imaging sensors (e.g., 34d-1 and 38d-1) are substantially aligned and substantially overlap one another, and the FOVs of corresponding first and second imaging sensors (e.g., 34d-1 and 38d-1) can at least partially overlap the FOVs of one or more adjacent sets of corresponding first and second imaging sensors (e.g., 34d-2 and 38d-2) such that images from a first imaging sensor (e.g. 34d-1) can be stitched with images from an adjacent (and partially overlapping) first imaging sensor (e.g., 34d-2) and images from a second imaging sensor (e.g., 38d-1) can be stitched with images from an adjacent (and partially overlapping) second imaging sensor (e.g., 38d-2).

In the embodiment shown, the imaging system further comprises a plurality of third imaging sensors 42 (e.g., cameras such as video cameras). The reference numeral 42 is used herein to refer to third imaging sensors in general, and more-specific reference numbers (e.g., 42b-1) are used to refer to specific third imaging sensors. The plurality of third imaging sensors 42 can have a third spectrum (e.g., different from the first spectrum of first imaging sensors 34 and the second spectrum of second imaging sensors 38) such as, for example, infrared (IR), visible near-infrared (VNIR), image intensified ($I^2$), color VNIR, or the like. As will be appreciated individually by those of ordinary skill in the art, each third sensor 42 has a FOV (which may, for example, have the same or a different size than the FOV of any first and/or second imaging sensor). In the embodiment shown, each third imaging sensor is configured to be (and in the embodiment shown, actually is) coupled to the vehicle (e.g., by way of an sensor pod) such that the FOV of the third imaging sensor is substantially aligned with the FOV of a corresponding first imaging sensor and the FOV of a corresponding second imaging sensor. For example, the FOV of third imaging sensor 42d-1 is substantially aligned with (and substantially entirely overlaps) the FOV of the corresponding first imaging sensor 34d-1 and with the FOV of the corresponding second imaging sensor 38d-1.

In the embodiment shown, processing unit is coupled to the imaging sensors and/or the sensor pods by way of cables 46. Cables 46 can be any suitable cable including, for example, ethernet cables, coaxial cables, IEEE1394 (FireWire— ™Apple, Inc.) cables, fiber optic cables, or the like.

In the embodiment shown, processing unit 22 is configured to be coupled to the imaging sensors (and is coupled to the imaging sensors) and to receive images from the first and second imaging sensors and to generate an image model in substantially real-time by: (a) warping images from corresponding first, second, and/or third imaging sensors (e.g., 34d-1, 38d-1, and/or 42d-1); (b) fusing images from corresponding first, second, and/or third imaging sensors (e.g., 34d-1, 38d-1, and/or 42d-1); and (c) stitching images from imaging sensors with partially overlapping FOVs (e.g., 34d-1, 34d-2). A processing unit that is "configured to receive images from the first and second imaging sensors" is configured to receive as few as two images, such as, for example, one image from each sensor or both from one sensor.

The processing unit can comprise any suitable hardware and/or devices, such as, for example, one or more image grabbers, one or more network switches, one or more graphics processors (e.g., cards), one or more processors, one or more A/D converters, and/or any other suitable hardware or combinations thereof that permit the processing unit to perform some or all of the functions described herein.

In some embodiments, the processing unit is based on a Vita 41 (VXS) computing architecture using the architecture's corresponding "dot" specifications and PICMG 2.16 specifications. In such embodiments, the processing unit can be configured to include COTS modules, processors, graphics processors, and GigE switches. Such COTS items can be customized or modified. The processing unit can also include matrix switches, frame grabbers, video encoders, and/or integrated data acquisition units (IDAU). In some embodiments, the housing or chassis of the processing unit can be a conduction cooled ½ ATR short configuration per standard ARINC 404 configurations. In some embodiments, the processing unit can be configured to include four VXS slots and one CPCI PICMG 2.16 slot. In some embodiments, the processing unit comprises computer-executable code (e.g., in OpenGL language) embodied or encoded on tangible computer-readable media such as, for example, one or more processors, FPGAs, image boards, hard-drives, optical drives, flash drives, or the like.

Image fusion is described here with reference to only images from first and second imaging sensors; however, it should be appreciated that the same principles can be extrapolated to include images from third imaging sensors. In the embodiment shown, the processing unit is configured to fuse (using an alpha-blending or alpha-compositing algorithm) images from corresponding first, second, and/or third imaging sensors, such that, for example, the first images and second images are unified into fused images (e.g., fused video images). In some embodiments, the imaging system is configured such that, if the processing unit is coupled to a display and a corresponding user-input device, a user can adjust, via the user-input device, the intensity of images from the first imaging sensors relative to the intensity of fused images from the second imaging sensors in a portion of the image model shown on the display. In the embodiment shown, the processing unit is also configured to adjust the intensity of images from the first imaging sensor relative to the intensity of images from the second imaging sensor in the fused images, such as, for example, in response to an input from a user via a user input device 30. Stated another way, the processing unit is configured to adjust (e.g., in response to user input) the fused images in the image model between one extreme of 100% first-imaging-sensor images and 0% second imaging-sensor images (100:0), and the other extreme of 0% first-imaging-sensor images and 100% second imaging-sensor images (0:100), and/or various relative intensities between these two extremes, such as, for example, one of, or range between, any of about: 100:0, 95:5, 90:10, 85:15, 80:20, 75:25, 70:30, 65:35, 60:40, 55:45, 50:50, 45:55, 40:60, 35:65, 30:70, 25:75, 20:80, 15:85, 10:90, 5:95, and 0:100. In some embodiments, the image-fusion board can be configured such that it can only adjust the relative intensities between discrete points or ranges between the points listed above, and/or such that it cannot adjust the relative intensities of fused images (e.g., the ratio may be fixed at 50:50 or any other ratio between 0:100 and 100:0).

The processing unit can be configured to fuse images in any suitable way. For example, the processing unit can be configured to stitch images from first images into a first layer of the image model, and to stitch images from second imaging sensors into a second layer of the image mode. In this way, the relative opacity of the first layer can be varied relative to the opacity of the second layer, such that when the two layers are displayed together (e.g., overlaid) to a user (e.g., via a display), a user can perceive portions of both images (e.g., white hot regions from an IR layer and color regions from a color-VNIR layer). In some embodiments, the processor is configured to permit a user to also and/or alternatively access unstitched images from individual imaging sensors (e.g., by way a virtual, non-blocking matrix architecture).

In the embodiment shown, the processing unit is further configured to scale one or both of the images from the corresponding first, second, and/or third imaging sensors, such that the images share a common scale (size and/or resolution) prior to fusing them into fused images.

As also mentioned above, the processing unit shown is also configured to warp images from corresponding imaging sensors with substantially aligned FOVs, and to stitch images from imaging sensors with partially overlapping FOVs. For example, one exemplary embodiment of image stitching and warping is described in more detail below with reference to FIG. 3.

In the embodiment shown, the first, second, and third imaging sensors are digital such that the imaging sensors output images in digital format, and the processing unit is configured to receive images in a digital format. In other embodiments, one or more of the first, second, and third imaging sensors can be analog such that one or more analog imaging sensors output images in an analog format, and the processing unit is configured to convert analog images from analog format to digital format (e.g., by way of an A/D converter) before generating the image model. In the embodiment shown, the processing unit is configured to output the image model (or a portion of the image model) in digital format. In other embodiments, the processing unit can be configured to output the image model (or a portion of the image model) in analog format or in analog and digital format.

In some embodiments, the imaging system further comprises a wireless communication device (which may, for example, be included in the processing unit) coupled to the processing unit and configured to transmit at least a portion of the image model to a remote receiver. Remote receivers can include, for example, a display remotely located from the vehicle such as a display carried or worn by a soldier or a display in another vehicle. The wireless communication device can comprise any suitable hardware or devices, such as, for example, a cellular transceiver, a satellite transceiver, a bluetooth transceiver, an RF transceiver, or the like. In some embodiments, the wireless communication device is further configured to receive signals from a remote user-input device. In some embodiments, the processing unit is further configured to compress at least a portion of the image model prior to the wireless communication device transmitting the at least a portion of the image model to a remote receiver.

The processing unit is further configured to be coupled (and in the embodiment shown, is coupled) to two or more displays (e.g., 26) such that the two or more displays can simultaneously each show a different portion of the image model. For example, if two displays are coupled to the processing unit, and one display shows a first portion of the image model, the second display can show a second portion of the image model that may or may not overlap with the first portion of the image model shown by the first display.

In the some embodiments, the processing unit is configured to be coupled to two or more user-input devices 30 each corresponding to a different display 26. In other embodiments, the processing unit can be configured to be coupled to only one display and/or one user-input device corresponding to the one display. In the embodiment shown, the processing unit is coupled to three displays 26 by way of cables 50. Cables 50 can comprise any suitable cables, such as, for example, GigE cables, SerDes cables, ethernet cables, coaxial cables, IEEE1394 (FireWire—™Apple, Inc.) cables, fiber optic cables, or the like. In other embodiments, the imaging system can comprise any suitable number of displays, such as for example, one, two, four, or the like. The displays can be any suitable displays, such as, for example, LCD monitors, CRT monitors, or the like, or any combination thereof. In some embodiments, the processing unit is configured to be coupled to at least one user-input device that is integral to a corresponding display, such as, for example, a touch-screen display.

In the embodiment of FIG. 2, the processing unit is configured to be coupled to a display 26 and a corresponding user-input device 30 such that a user can electronically zoom (e.g., without changing the optical properties of any imaging sensors) in on a portion of an image or image model, and/or such that a user can optically zoom in on an object depicted in a portion of an image or image model, such as, for example, by optically zooming one or more (up to all) individual imaging sensors. In the embodiment shown in FIG. 2, the processing unit is configured to be coupled (and/or is coupled) to a weapon turret 58 (e.g., via a suitable cable 62) such that a user can control the weapon turret 58 via a display 26 and/or user-input device 30.

As shown in FIG. 1, the depicted embodiment of the imaging system comprises a front sensor pod 18a, two side sensor pods 18b and 18c, and a rear sensor pod 18d. The sensor pods 18a-18d comprise sets 54 of imaging sensor that each capture images for one of seven azimuth (horizontal) image slices or one of four upward (overhead) image slices. These image slices can be warped and stitched into a hemispherical image model that includes 360 degrees around the vehicle (e.g., 500 shown in FIG. 5A below) and/or also extends over the vehicle (e.g., 550 shown in FIG. 5B below). The reference numeral 54 is used here to refer to sets, in general, of imaging sensors; and more-specific reference numbers (e.g., 54d-1) are used to refer to specific sets of imaging sensors. As will be individually appreciated by those of ordinary skill in the art, the FOV of each imaging sensor creates what can be described as a "slice" or "image slice" because as the distance increases from the aperture or lens of the imaging sensor, the area increases within the FOV of the imaging sensor. In the embodiment shown, each slice comprises: (a) the FOV of one first imaging sensor, (b) the FOV of one corresponding (substantially aligned) second imaging sensor, and (c) the FOV of one corresponding (substantially aligned) third imaging sensor, such that the three corresponding imaging sensors share a common, substantially overlapping FOV. In this way, each image slice includes substantially all of the FOVs of the respective three corresponding (substantially aligned) imaging sensors. Other embodiments can have any suitable number or configuration of azimuth and/or upward slices. Similarly, other embodiments can have any suitable number of imaging sensors in each set (slice), such as, for example, one, two, four, or more imaging sensors in each set.

More specifically, in the embodiment shown, the front sensor pod 18a captures images from three azimuth slices and one upward slice, each side sensor pod 18b and 18c captures images for one azimuth slice and one upward slice, and the rear sensor pod 18d captures images for two azimuth slices and one upward slice. For example, the forward sensor pod 18a includes three slices, and therefore three sets 54a of imaging sensors (each with a first imaging sensor 34, a second imaging sensor 38, and a third imaging sensor 42). The middle set 54a-2 has a common FOV that is centered on the longitudinal axis of the vehicle such that the FOV faces directly forward of the vehicle. The left set 54a-1 is rotated relative to the middle set 54a-2, such that the common FOV of the left set 54a-1 only partially overlaps the common FOV of the middle set 54a-2. In this way, images captured by the left set 54a-1 of imaging sensors can be warped and stitched with images captured by the middle set 54a-2 of imaging sensors. The right set 54a-3 is not shown, but its position is minor opposite of the left set 54a-1 relative to the middle set 54a-2. That is, the right set 54a-3 is rotated right relative to the middle set 54a-2 to the same degree that the left set 54a-1 is rotated left relative to the middle set 54a-2. In the embodiment shown, the imaging system is configured such that: the common FOV of left set 54a-1 partially overlaps the common FOV of set 54b-1 on side sensor pod 18b; the common FOV of set 54b-1 partially overlaps the common FOV of set 54d-1 on rear sensor pod 18d; and so on around the vehicle, such that images captured by each set 54 can be warped and stitched with images captured by the adjacent sets 54.

In the embodiment shown, each sensor pod 18 also comprises an upward-facing set capturing images in one of the four upward slices. Specifically, forward sensor pod 18a comprises set 54a-4; side sensor pods 18b and 18c comprise sets 54b-2 and 54c-2, respectively; and rear sensor pod 18d comprises set 54d-3. As with the azimuth sets (e.g., 54a-1, 54b-1) described above, the upward sets each include substantially aligned (corresponding) first, second, and third imaging sensors with a common FOV. As shown, the imaging system is configured such that: the common FOV of upward set 54a-4 partially overlaps the common FOVs of horizontal sets 54a-1, 54a-2, and 54a-3; the common FOV of set 54a-4 partially overlaps the common FOV of set 54b-2 on side sensor pod 18b; and so on around the vehicle, such that images captured by each set 54 can be warped and stitched with images captured by the adjacent sets 54 into a common image model (e.g., 550).

In one exemplary embodiment, the first, second, and third imaging sensors, respectively, have the specifications displayed in Table 1. When imaging sensors having the specifications in Table 1 are used in the imaging system configuration of FIG. 1, the seven azimuth slices cover a combined azimuth field of view (FOV) of 360°×55°; the four upward slices cover the overhead FOV of 360°×63°, together establishing hemispherical coverage around the vehicle; and each slice contains three imaging assets: a color day camera, an image intensified (I2 or low light) camera, and a long wave infrared (LWIR) camera.

FOV (e.g., 100 degrees). Examples of a suitable circuit card assembly (CCA) for use with the IR sensor is the Casper II CCA, manufactured by BAE Systems for the MIM500X LWIR camera. Other suitable IR sensors (e.g., cameras) and CCAs are available from FLIR Systems, in Goleta Calif. One example of a suitable I2 imaging sensor (camera) is the E3010 Camera available from INTEVAC Photonics, Inc., Santa Clara, Calif., U.S.A. Color-daylight (color-VNIR) imaging sensors can be ruggedized COTS visible-spectrum camera. In some embodiments, the VNIR sensor has automatic shutter control and/or a good quantum efficiency (QE) at wavelengths of up to 905 nanometers (nm). In some embodiments, the VNIR sensor includes an f1.4 lens (or lens set) having a 40° field-of-view (FOV).

Figure 3:
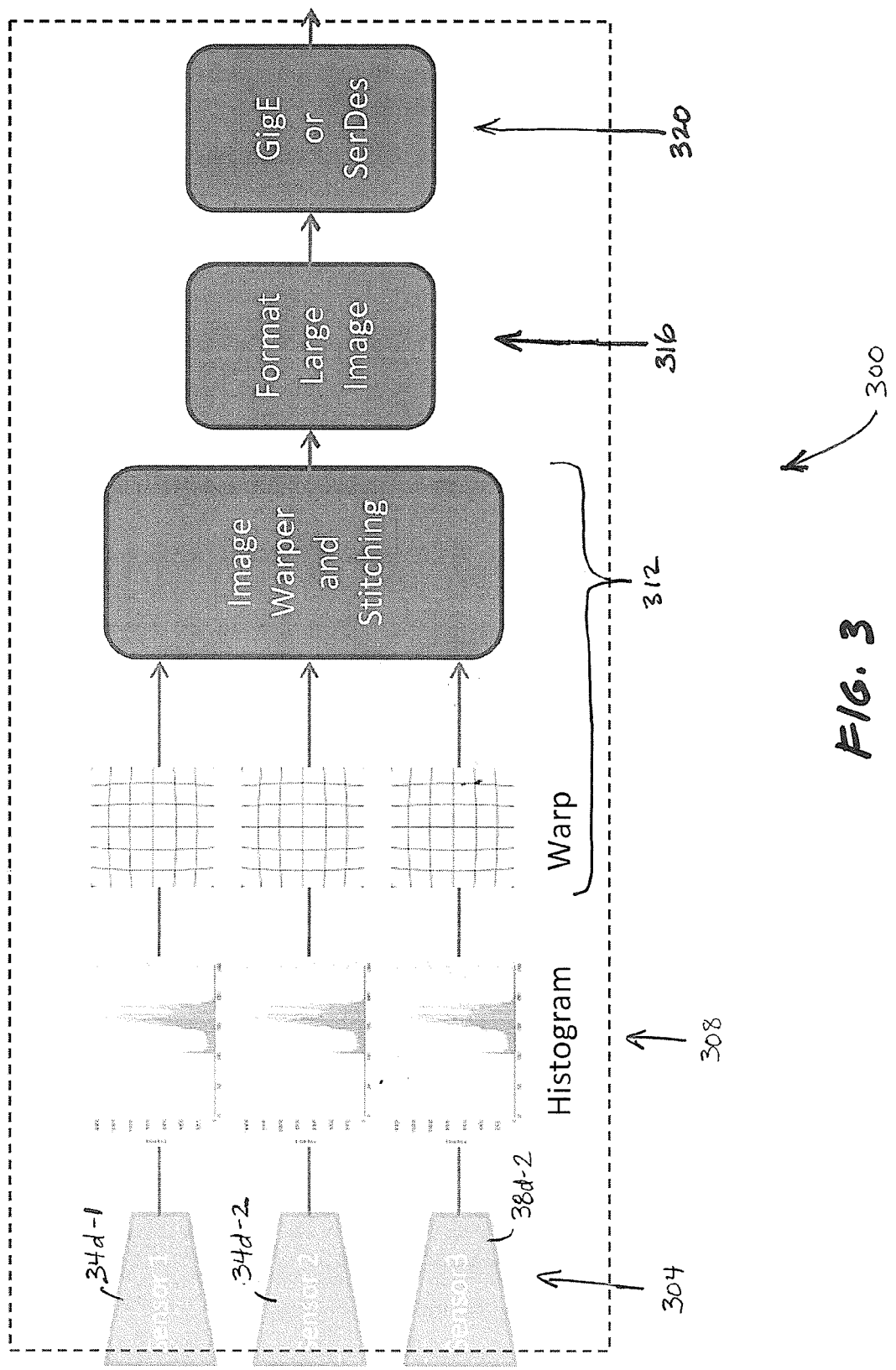
FIG. 3 depicts a flow diagram of one embodiment of a method of warping and stitching images.

Referring now to FIG. 3, one embodiment is shown of a method 300 of warping and stitching images. In a first step 304, images are captured by imaging sensors (e.g., 34d-1 and 34d-2) with partially overlapping FOVs and output to the processing unit. In step 308, a stitch line is selected in the overlapping portion of an image from each partially overlapping sensor and the stitch line is analyzed for each image (e.g., for an image from first imaging sensor 34d-1 and for an image from first imaging sensor 34d-2), such as, for example, to develop a histogram of each image at the stitch line. The stitch line, for example, can be at an overlapping edge of either image, or can be in the middle of the overlapping portions of the partially overlapping images. Because, the FOVs of the imaging sensors partially overlap, as long as the stitch line is selected in the overlapping region, the stitch line should be the same for both images. In this way, the histogram for each image can be compared and the image (and/or subsequent images) from one or both of the partially overlapping imaging sensors can be warped at step 312 such that the image stitch line of both images match. Once the stitch lines are matched, the images can be digitally stitched together into a combined image. For imaging sensors with a FOV that partially overlaps each of the FOVs of two or more other imaging sensors, these

TABLE 1

Example of Imaging Sensor Specifications

| SPECTRAL TYPE (Spectrum) | MIN WIDTH (Pixels) | MIN HEIGHT (Pixels) | FOV (Degrees) | SENSITIVITY | FRAME SPEED |
|---|---|---|---|---|---|
| Azimuth Slice Imaging Sensors (Cameras) | | | | | |
| Color Daylight (First) | 1280 | 1024 | 73 × 58 | <1 lux | 30/60 Hz |
| Image-Intensified $I^2$ (Second) | 1280 | 1024 | 73 × 58 | <0.001 lux | 30/60 Hz |
| LWIR (Third) | 640 | 480 | 73 × 55 | <50 mK | 30/60 Hz |
| Upward Slice Imaging Sensors (Cameras) | | | | | |
| Color Daylight (First) | 1280 | 1024 | 100 × 80 | <1 lux | 30/60 Hz |
| Image-intensified (Second) | 1280 | 1024 | 100 × 80 | <0.001 lux | 30/60 Hz |
| LWIR (Third) | 640 | 480 | 100 × 75 | <50 mK | 30/60 Hz |

One example of a suitable LWIR sensor is the MIM500X infrared sensor (camera) manufactured by BAE Systems, with offices and manufacturing facilities across the United States. In some embodiments, the LWIR sensor includes a hard carbon-coated germanium, f1.0 lens (or lens set) having a 40° field of view. In some embodiments, the LWIR sensor includes a 640×480 pixel, un-cooled, micro-bolometer detector with a spectral range of 8-14.5 μm spectral range. Other IR imaging sensors can also be used, such as, for example, BAE Systems (or IR Imaging Systems (IRIS), which is currently a division of BAE Systems) LWIR cameras with any suitable steps can be iteratively repeated for each partially overlapping sensor. In some embodiments, this process is iteratively repeated for a plurality of pairs of images. In some embodiments, step 312 includes stitching and/or warping the combined image with other combined images to generate the image model. For clarity and brevity, the stitching process is described for two images each from a different partially overlapping imaging sensor; however, it should be understood that the same principles can be applied to multiple images or moving images from each imaging sensor.

Where a partially overlapping imaging sensor (e.g., 34d-2) is also substantially aligned with another imaging sensor (e.g., 38d-2), images from the substantially aligned imaging sensor (e.g., 38d-2) can be warped in the same fashion as the imaging sensor that the imaging sensor is substantially aligned with (e.g., 34d-2). In other embodiments where a partially overlapping imaging sensor (e.g., 34d-2) is also substantially aligned with another imaging sensor (e.g., 38d-2), an image from each can be analyzed in similar fashion (e.g., for one or more common edges or lines) can be analyzed and compared as described above, and one or more can be warped such that the two images (and/or subsequent images) properly correspond to one another.

Once the images are suitably warped and/or stitched, the combined image can be formatted at step 316. The formatting can be include any suitable processes, such as, for example, changing the resolution, size, file format (e.g., tiff, jpeg, mpeg, mov, or the like), or the like of the combined image. At step 320, the combined images and/or the image model can be output to a subsequent portion of the processing unit or to a display 26 (e.g., via a cable 50).

Figure 4A:
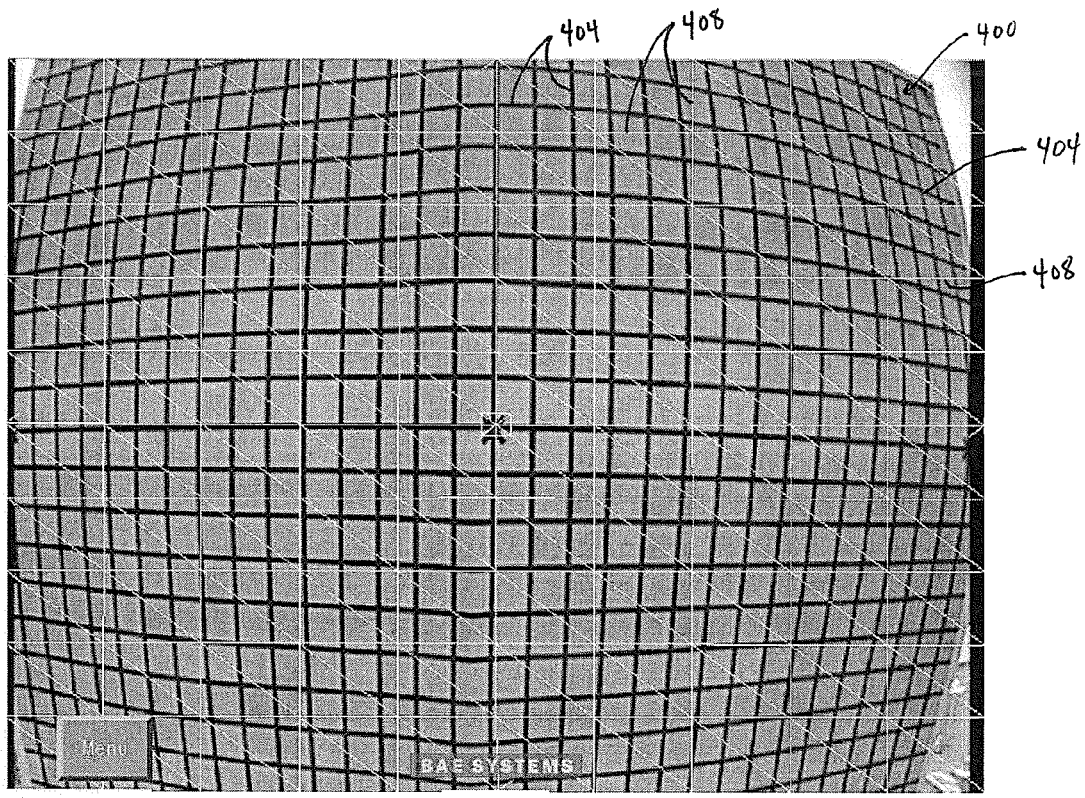
FIGS. 4A-4C depict methods of generating warp templates and stitch templates for generating images models with the present imaging systems.
Figure 4B:
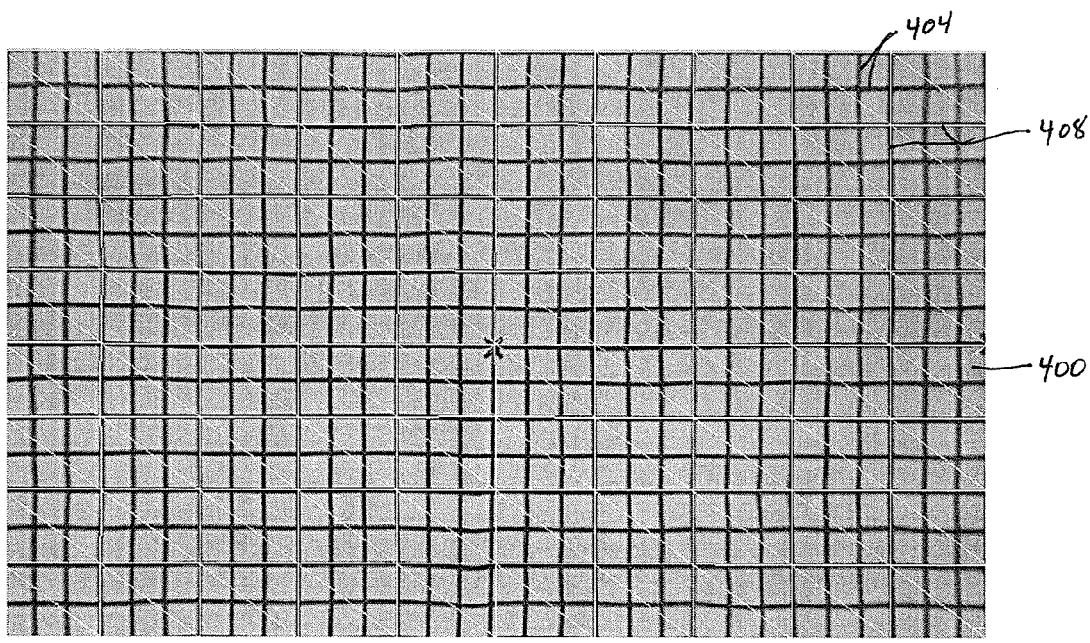
Figure 4C:
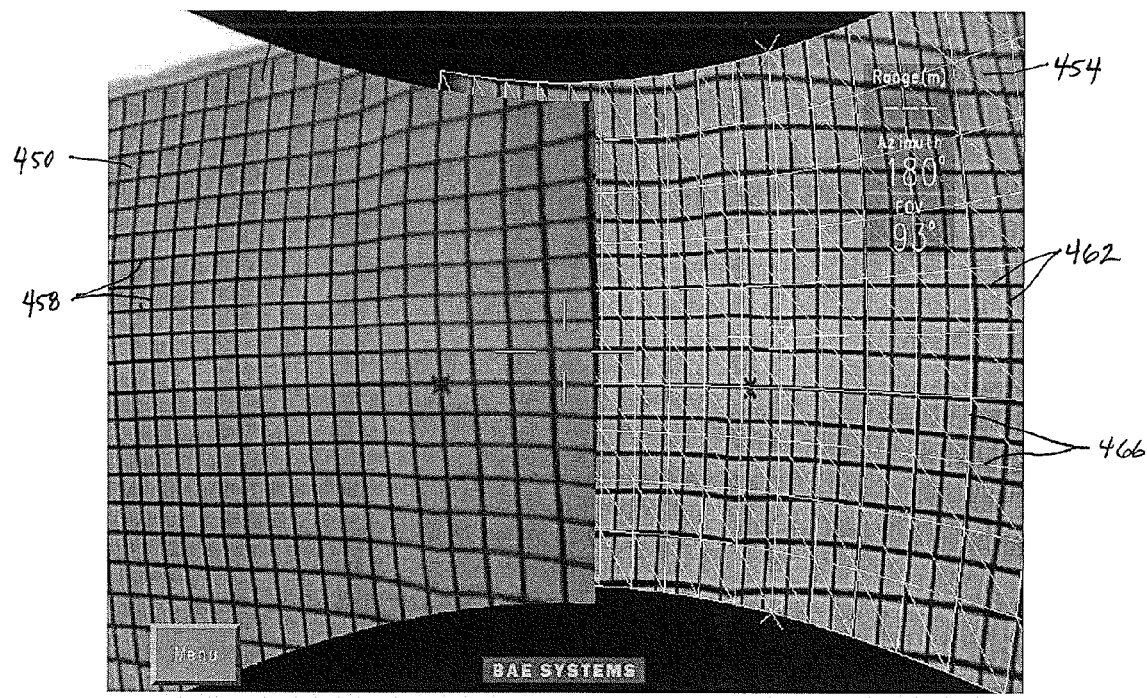

Referring now to FIGS. 4A-4C steps are shown for generating warp templates and stitch templates for generating images models with the present imaging systems. In some embodiments, the processing unit (e.g., centralized or distributed) is configured to generate an image model in substantially real-time by warping, stitching, and/or fusing images. As illustrated in FIGS. 4A-4B, in some embodiments, the processing unit is configured to warp images using predefined warp templates. One method of generating an image model comprising warping images from an imaging sensor comprises: (1) showing on a display an image 400 captured by an imaging sensor; (2) showing on the display an image grid 404 overlaid on image 400 corresponding to the curvature of the image (and/or of the lens of the imaging sensor); (3) showing on the display a reference grid 408 corresponding to a desired curvature (e.g., lack of curvature) of the image; (4) responsive to signals (e.g., from a user via a user-input device such as a mouse coupled to the display) or automatically, warping image grid 404 to align with (e.g., such that vertical lines of the image grid align with vertical lines of the reference grid and such that horizontal lines of the image grid align with horizontal lines of the reference grid) such as is shown in FIG. 4B; (5) storing the warped image grid as a warp template; and (6) applying the warp template to subsequent images (or image frames) captured by the imaging sensor such that the subsequent images (or image frames) are automatically warped according to the warp template. The warp template (and images) can be warped in any suitable fashion across the warp template, and such warping need not be evenly distributed across the warp template. The processing unit can be configured to perform these steps to permit a user to generate a warp template) for each coupled imaging sensor. In this way, warping of images from imaging sensors can be calibrated (e.g., once, intermittently, or periodically) such that subsequent images (subsequent to the calibration or predefining the stitch template) are warped according to the warp template until the warp template is deleted or modified. Image grid 404 is shown as an aid for a user. In some embodiments, the image grid is omitted such that a user is permitted to "click" and "drag" portions of the image directly, and the corrections or "warps" are saved as the warp map.

As illustrated in FIG. 4C, in some embodiments, the processing unit is configured to stitch partially overlapping images using a predefined using predefined stitch templates. One method of generating an image model comprising warping images from an imaging sensor comprises: (1) showing on a display at least a portion of an image 450 captured by an imaging sensor and at least a portion of an image 454 (that partially overlaps image 450) captured by a different imaging sensor; (2) showing on the display an image grid 458 (e.g., warp template) overlaid on image 450; (3) showing on the display an image grid 462 (e.g., warp template) and/or a reference grid 466 overlaid on image 454; (4) responsive to signals (e.g., from a user via a user-input device such as a mouse coupled to the display) or automatically, moving and/or warping one or both of image grids 458 and 462 (and images 450 and 454) such that at least part of (up to all of) the overlapping portions of image grids 458 and 462 (and images 450 and 454) align with one another (e.g., such that vertical lines of the overlapping portions two image grids align with vertical lines of the reference grid and such that horizontal lines of the image grid align with horizontal lines of the overlapping portions two image grids); (5) storing the one or both warped image grids as stitch templates; and (6) applying each stitch template to subsequent images captured by the respective imaging sensor such that the subsequent images captured by the imaging sensor are automatically stitched according to the stitch template. In some embodiments, the stitch template can include only the position of the warp template, the stitch template can include both the position and further warping, and/or the stitch template can be integral to the warp template, e.g., the method of forming or generating the stitch template can comprise adjusting the warp template and/or positioning the warp template relative to another warp template. The processing unit can be configured to perform these steps to permit a user to generate a stitch template) for each coupled imaging sensor. In this way, stitching of images from partially overlapping imaging sensors can be calibrated (e.g., once, intermittently, or periodically) such that subsequent (subsequent to the calibration or predefining the stitch template) are stitched according to the stitch template until the stitch template is deleted or modified.

Warping image grids can be, for example, by way of "clicking" and "dragging" a one or more portions of an image grid (e.g., a horizontal line, vertical line, angled line, or a node at an intersection of two or more vertical, horizontal, or angled lines). Warping can comprise any suitable change, including, for example, linear translation (e.g., up, down, left, right), curve matching, linear-to-curved or curved-linear (e.g., horizontal controlled linear-to-spherical scale-up correction, horizontal controlled linear-to-spherical scale-down correction, vertical controlled linear-to-spherical scale-up correction, or vertical-controlled linear-to-spherical scale-down correction). Similar grids and overlays can be applied to calibrate substantially aligned imaging sensors such that fused images are substantially aligned and subsequent images from one or each corresponding imaging sensors are automatically warped or positioned to be substantially aligned with images from the other corresponding image sensors. Such alignment templates can be generated similarly to what is described above for FIG. 4A-4B with a first substantially aligned image being warped to match a second substantially aligned image. In this way, alignment of images from substantially aligned imaging sensors can be calibrated (e.g., once, intermittently, or periodically) such that subsequent images (subsequent to the calibration or predefining the stitch template) are aligned (e.g., to be fused) according to the alignment template until the alignment template is deleted or modified. As used in this disclosure, warp templates, stitch templates, and alignment templates can be predefined by a user in the manner described with reference to FIGS. 4A-4C.

Figure 5A:
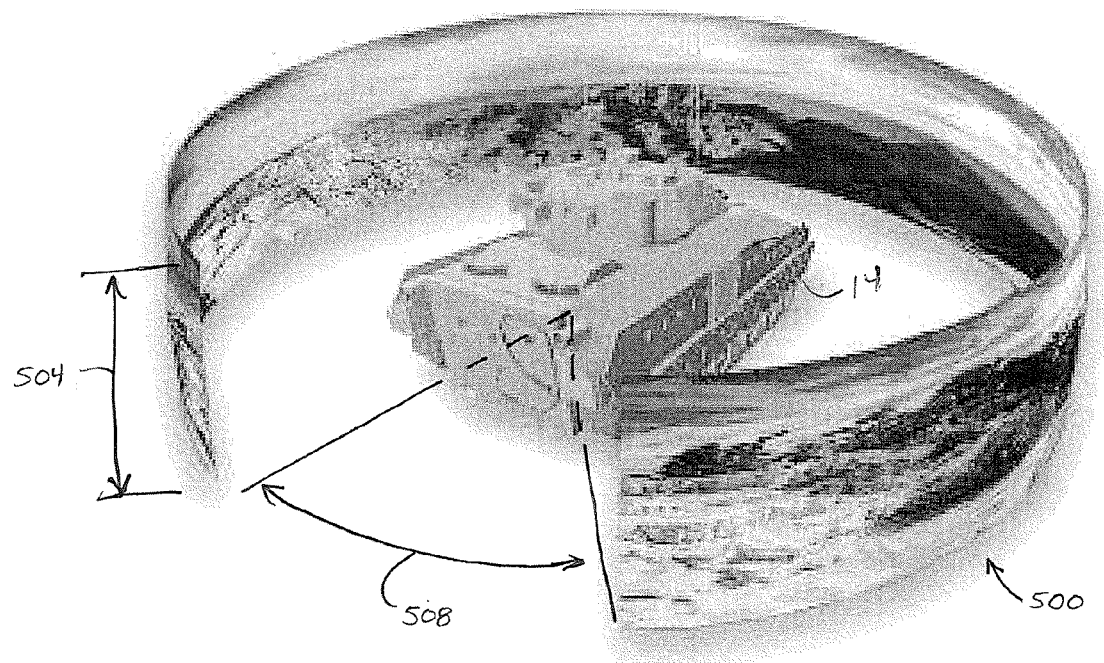
FIGS. 5A and 5B depict image models generated by various embodiments of the present imaging systems when coupled to vehicles.
Figure 5B:
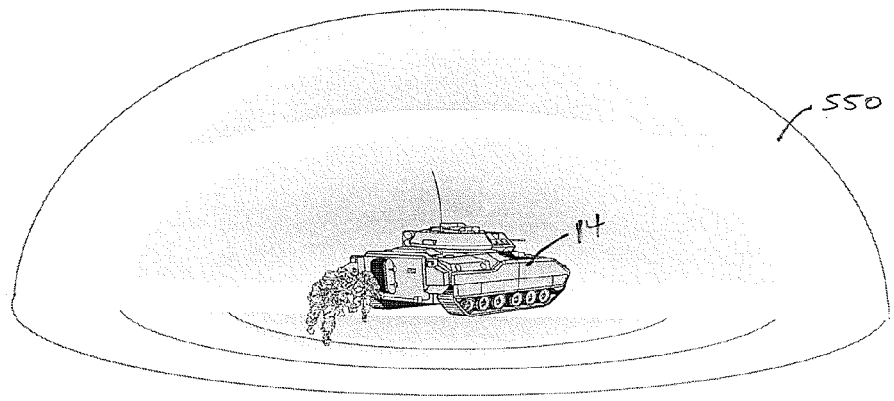

Referring now to FIGS. 5A and 5B, image models are shown that can be generated by various embodiments of the present imaging systems when coupled to a vehicle. FIG. 5A depicts a curved or warped panoramic image model 500 that can be generated by certain embodiments of the present imaging systems. Image model 500 is shown having a constant degree of curvature around the vehicle 14 with a constant height 504. In other embodiments, image model 500 can have various degrees of curvature that may be non-constant or may change around the vehicle. As shown, image model 500 has a gap 508 such that the image model does not surround the entire vehicle. In some embodiments, the gap is zero degrees such that the image model wraps around the entire vehicle. In other embodiments, gap 508 can have any suitable value such that the image model wraps around or encircles any suitable angular sweep around the vehicle, such as, for example, less than, greater than, equal to, or between any of about: 180, 200, 220, 225, 240, 260, 270, 300, or 330 degrees.

FIG. 5B depicts a hemispherical image model 550 that can be generated by the embodiment of the imaging system shown in FIG. 1. Image model 550 includes a 360-degree angular horizontal sweep that surrounds the vehicle and also surrounds the top of the vehicle. While image model 550 is shown with a smooth or constant degree of curvature around the vehicle, in other embodiments, image model 550 can have any suitable shape, such as, for example a non-constant or varying degree of curvature. In other embodiments, image model 550. In some embodiments, image model 550 can be discontinuous. For example, image model 550 can have a gap similar to gap 508 described for image model 500.

Figure 6:
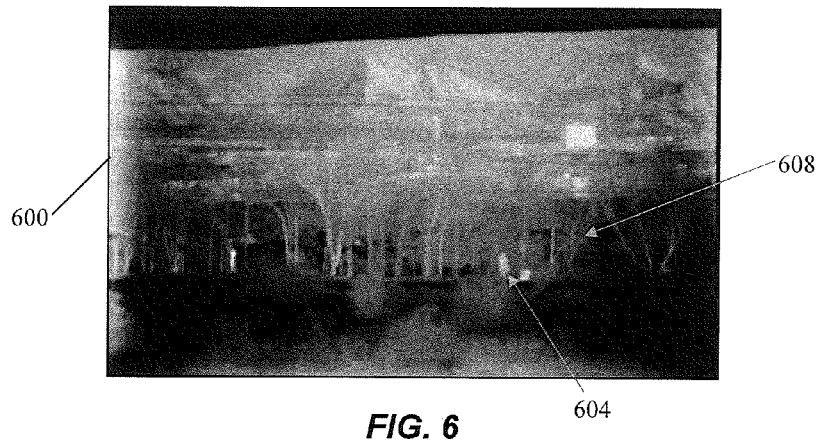
FIG. 6 depicts an image captured by an infrared (IR) sensor in one of the present imaging systems.

Referring now to FIG. 6, a screenshot 600 from a display 26 is shown including an IR image captured by an infrared (IR) imaging sensor suitable for use in (or with) the present imaging systems. As will be understood by those of ordinary skill in the art, the IR image depicts relatively warmer objects (e.g., a human 604) in lighter shades relative to cooler objects (e.g., a tree 608) in darker shades. Some embodiments of the present imaging systems are configured such that the polarity (white-hot, black-hot) of IR images can be adjusted (e.g., by a user via a user-input device 30).

Figure 7:
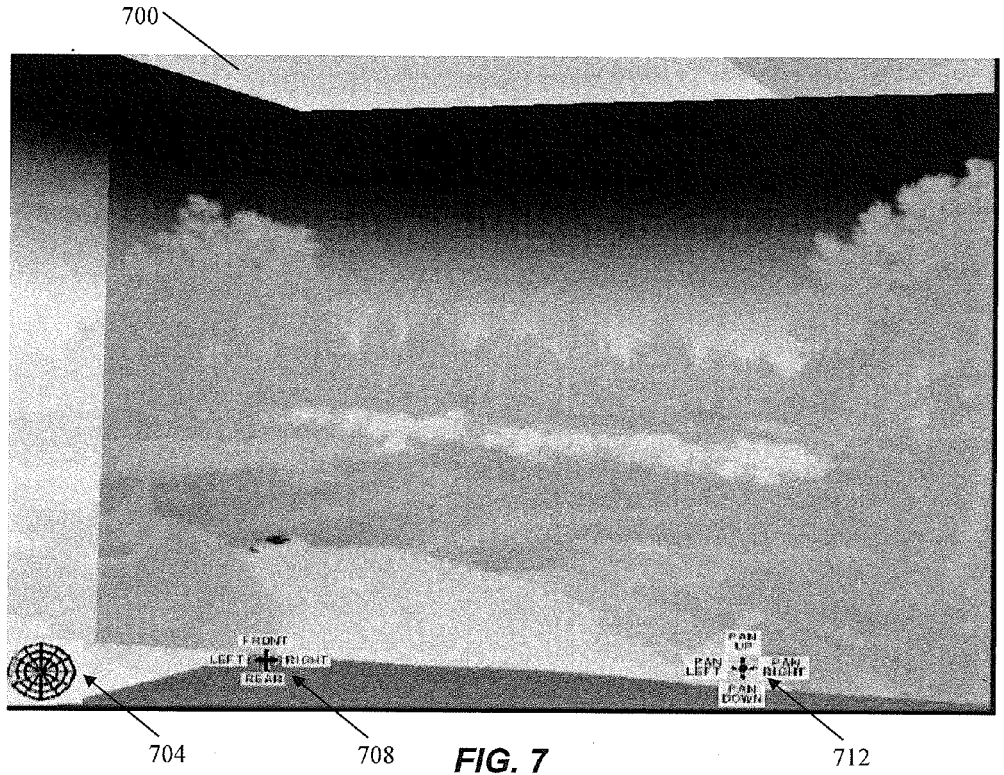
FIG. 7 depicts a screenshot from a display for use with embodiments the present imaging systems.

Referring now to FIG. 7, a screenshot 700 from a display 26 is shown including indicators overlaid or shown in conjunction with a portion of an image model. In some embodiments (such as embodiments that are configured to display screenshot 700), the imaging system is configured such that, if the processing unit is coupled to the display, the display can also show a reference indicator (e.g., 704) indicative of the orientation of the portion of the image model shown on the display relative to the orientation of the vehicle. For example, when the portion of the image model shown on the display is from a sensor facing the front of the vehicle, indicator 704 can have a dot or highlighted portion at a corresponding front portion of indicator 704, such that a user viewing the display can ascertain that the portion of the image model shown includes images from in front of the vehicle. In other embodiments, indicator 704 can comprise any suitable indicators, such as, for example, absolute bearing, vehicle instrument overlays (e.g., speed, fuel, and the like), or any other indicators that may be useful for a user viewing the display.

The imaging system can also be similarly configured to comprise controls overlaid or shown in conjunction with the portion of the image model shown on a display. For example, screenshot 700 further illustrates controls 708 and 712 overlaid or shown in conjunction with the portion of the image model shown (e.g., for a touch-screen display). Specifically, in the embodiment shown, control 708 includes portions corresponding to the front, left, right, and rear of the vehicle such that a user can quickly navigate to a view on the front, left, right, or rear of the vehicle by touching or otherwise selecting the respective portion of control 708. Control 712 is similarly configured to permit a user to navigate the image model relative to the portion of the image model currently shown on the display. More specifically, control 712 includes portions that permit a user to pan up, pan left, pan right, or pan down by touching or otherwise selecting the respective portion of control 712.

Figure 8:
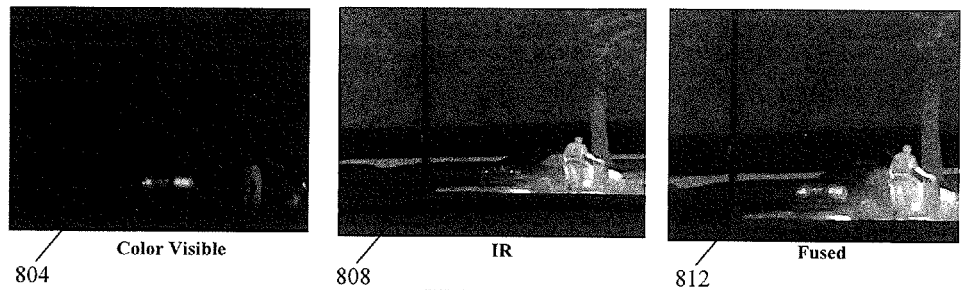
FIG. 8 depicts an image from a Color Daylight (CD) sensor, an image from a long-wavelength infrared (LWIR) sensor, and a fused image fused from the CD image and the LWIR image.

Referring now to FIG. 8, an image 804 from a color-visible (e.g., VNIR) sensor, an image 808 from a LWIR sensor, and a fused image 812 fused from the color-visible image and LWIR images are shown fused at about 50:50 relative intensities.

Figure 9:
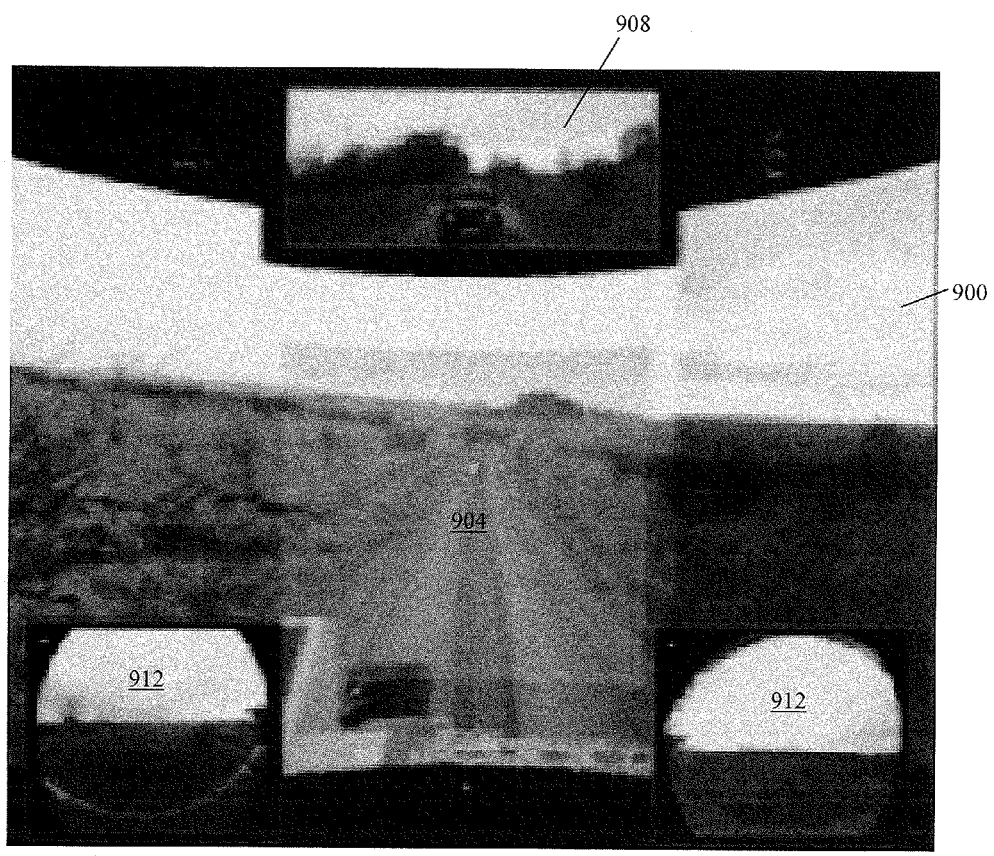
FIG. 9 depicts a driver's configuration of a display for use with embodiments of the present imaging systems.

Referring now to FIG. 9, a screenshot 900 is shown of a display having a driver's configuration for use with embodiments of the present imaging systems. In such embodiments, the imaging system is configured such that, if the processing unit is coupled to a display, the display can simultaneously show two or more different portions (e.g., 904, 908) of the image model. For example, in some embodiments, the display can simultaneously show a portion of the image model on the left side of the vehicle and a portion of the image model on the right side of the vehicle. In the embodiment shown, the imaging system is configured such, if the processing unit is coupled to a display, the display can simultaneously show a front portion 904 of the image model including images of in front of the vehicle and a rear portion 908 of the image model including images of behind the vehicle. In some embodiments, rear portion 908 is shown mirrored (e.g., a mirrored rear portion) to ensure that the display is intuitive for a user. For example, when an imaging sensor faces rearward from the vehicle, the left side of the imaging sensor's FOV will be aligned with the right side of a user that is facing the front of the vehicle. If images are merely shown on a display without being mirrored, the left side of the rearward-facing FOV will appear on the left side of the display and will seem (to a forward-facing user) to be on the left side of the vehicle. To account for this, images or a portion (up to all) of the image model from rearward-facing imaging sensors are "mirrored" (flipped such that the left side is shown at right and the right side is shown at left) in the display such that an object behind the vehicle on the right will be shown on the right side of rear portion 908 and an object behind the vehicle on the left will be shown on the left side of rear portion 908. Similar "mirroring" effects can be applied to other multi-views. For example, if user facing the left of the vehicle views a left portion of an image model with an inset of a right portion of the image model, the inset right portion of the image model can be mirrored such that the front and rear orientations of the left and right portions of the image model are shown consistent with one another so as to improve intuitiveness and reduce confusion. In the embodiment shown, the imaging system is configured such that, if the processing unit is coupled to the display, the display can also simultaneously show two side portions 912 of the image model, each side portion including images from a different side of the vehicle (e.g., images facing rearward from a different side of the vehicle such that the images act as a virtual or simulated side mirror).

In some embodiments, the imaging system is configured such that a display can show one or more raw (non-stitched, non-warped, non-fused) views or images from one or more individual imaging sensors. In other embodiments, the imaging system is configured such that a display can show one or more fused raw images (fused, but non-stitched and non-warped) from one or more individual sets of corresponding imaging sensors. In some embodiments, the processing unit (e.g., centralized or one or more distributed) are configured to generate multiple image models (e.g., forward image model, rear image model, and/or side image models).

Figure 10:
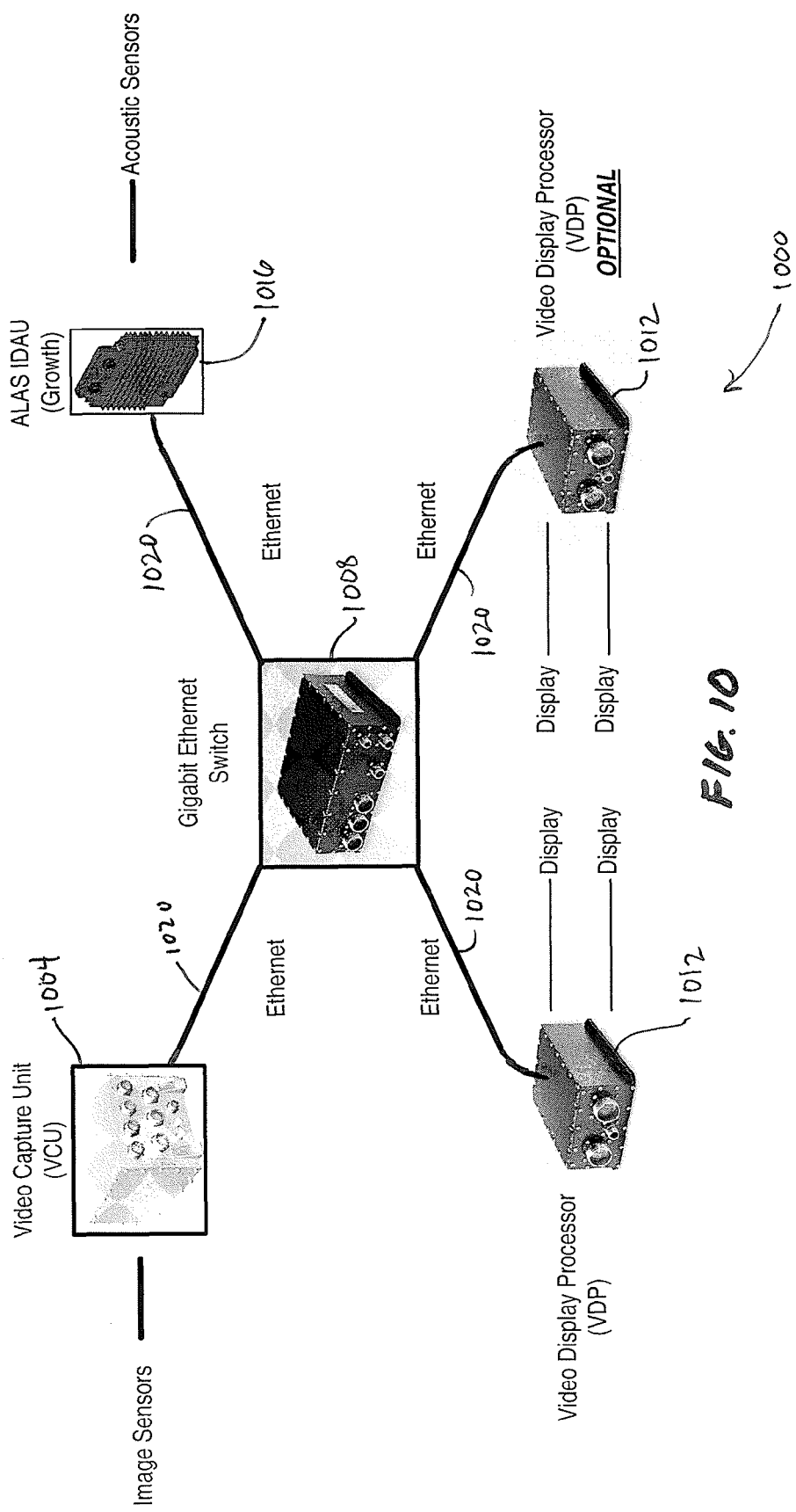
FIG. 10 depicts a diagram view of a processing unit for use with embodiments of the present imaging systems.

Referring now to FIG. 10, a diagram view is shown of an embodiment of a processing unit 1000 that is suitable for use with embodiments of the present imaging systems. Processing unit 1000 can be configured to function as described above for processing unit 22 and for imaging systems that include processing unit 22. Similarly, processing unit 22 can be configured to include any hardware or functionality described with reference to processing unit 1000. In the configuration shown, processing unit 1000 is a distributed processing unit (e.g., does not share a common housing). In other embodiments, processing unit 1000 can share a common housing similar to processing unit 22. Processing unit 1000 comprises a video capture unit (VCU) 1004 a network switch 1008, and at least one video display processor (VDP) 1012. In the embodiment shown, processing unit 1000 comprises two VDPs 1012. As shown, processing unit 1000 can also comprise an integrated data acquisition unit (IDAU) 1016.

In some embodiments, the processing unit 1000 can be configured to use Multicast addressing. In some embodiments, processing unit 1000 can be configured to be coupled to (and receive images from) progressive-scan analog cameras.

VCU 1004 is configured to be coupled to imaging sensors such that VCU 1004 can receive images from the imaging sensors, and to output received images. In some embodiments, VCU 1004 is configured to re-format received images before outputting them, and/or to resize, compress, or pre-process images before outputting them. For example, in some embodiments, VCU 1004 can be configured to warp partially overlapping images but not stitch or fuse them, or to warp and stitch partially overlapping images but not fuse substantially aligned images. VCU 1004 can comprise any suitable hardware, and may, for example, comprise one or more frame grabbers, video cards, or the like.

In some embodiments, the VCU can comprise eighteen modules integrated in a conduction-cooled enclosure to provide continuous data transfer at 1 Gb/s (e.g., with low and/or predictable latency). The VCU can also be configured to use an FPGA-based protocol engine, and/or can include a built-in programmable logic controller (PLC) for advanced real-time functionality (e.g., synchronization and triggering). For example, a synchronization signal can be output to corresponding (substantially overlapping) imaging sensors to synchronize their respective pixel clocks to reduce latency when generating an image model. In some embodiments, the VDP can be configured to support camera-to-VDP cable separations of up to 100 meters, and/or further with GigE switches.

Network switch 1008 can be any suitable network switch, such as, for example, a Gigabit Ethernet Switch. Network switch 1008 is configured to couple VCU 1004 to VDPs 1012 and/or to IDAU 1016. In the embodiment shown, VCU 1004, VDPs 1012, and IDAU 1016 are coupled to network switch 1008 by ethernet cables 1020, such as, for example Category-5 (CAT5) copper LAN cables. In other embodiments, cables 1020 can be any suitable cables configured to couple the various components of processing unit 1000. In some embodiments, the imaging system can be configured to enable a user to control (e.g., optically zoom) imaging sensors, such as, for example, with an EtherLink serial channel.

Each VDP 1012 is configured to be coupled to VCU 1004 (e.g., via network switch 1008) such that the VDP can receive images from the VCU. Each VDP 1012 is also configured to be coupled to one or more displays (e.g., 26) such that each coupled display can show images (e.g., in an image model) received from the VCU. In some embodiments, each VDP 1012 is configured to warp, stitch, and/or fuse images received from the VCU to generate an image model in substantially real-time. In some embodiments, each VDP is configured to generate only a portion of the image model (e.g., by warping, stitching, and/or fusing) only images corresponding to the portion of a vehicle's surroundings that are shown on a display. For example, if only a forward view from the vehicle is shown on a coupled display, the VDP can be configured to only generate a portion of the image model from images captured by imaging sensors with FOVs in front of the vehicle. In some embodiments, each VDP can be configured to be coupled to two displays such that the two displays can simultaneously each show a different portion of the image model (or of a portion of the image model generated by the VDP).

In some embodiments, the VDP comprises three analog or camera link Inputs, and a GigE Vision output. In some embodiments, the VDP comprises a FPGA (e.g., configured for video and three-link pass thru). In some embodiments, the VDP comprises additional interfaces, such as, for example, Inter-Integrated Circuit (I$^2$C), Serial Peripheral Interconnect (SPI), General Purpose Input Output (GPIO) (e.g., buffered), Universal Serial Bus (USB), and/or Joint Test Action Group (JTAG) connectors. The I$^2$C and the SPI interfaces can be configured to permit circuit expansion of electronics (e.g., circuit boards and the like). GPIO interfaces can be configured to permit additional input and output capabilities for the system For example, GPIOs are typically descrete signal interfaces which are interpreted by the VDP based on user or system inputs and/or outputs (e.g. low oil pressure indicator, high temp indicator, etc.). JTAG interfaces can be configured to permit testing and programming of electronics. In some embodiments, the VDP is further configured to provide image stabilization, video recording, round-robin recording (e.g., continuous). In some embodiments, the VDP is configured to provide DVR functionality (e.g., playback, pause, stop, rewind, and the like, such as, for example, via a user-input device). In the embodiment shown, the VDP is configured to function with a +5V DC input, and has a width of about 6.5 inches, a length of about 9.25 inches, and a height of about 4 inches.

IDAU 1016 is configured to be coupled to (and receive supplemental data from) additional sensors or systems, such as, for example laser-detector sensors or systems, LIDAR sensors or systems, RADAR sensors or systems, acoustic gunfire detection sensors or systems, and the like. In some embodiments, the imaging system is configured such that supplemental data can be shown on one or more displays along with a portion of the image model to which the supplemental data is relevant. For example, if an coupled acoustic gunfire detection sensor (or system) detects gunfire in front of the vehicle, data collected or approximated about that gunfire (e.g., the direction relative to the vehicle from which the gunfire originated) can be shown on a display corresponding to images at the front of the vehicle.

Figure 11:
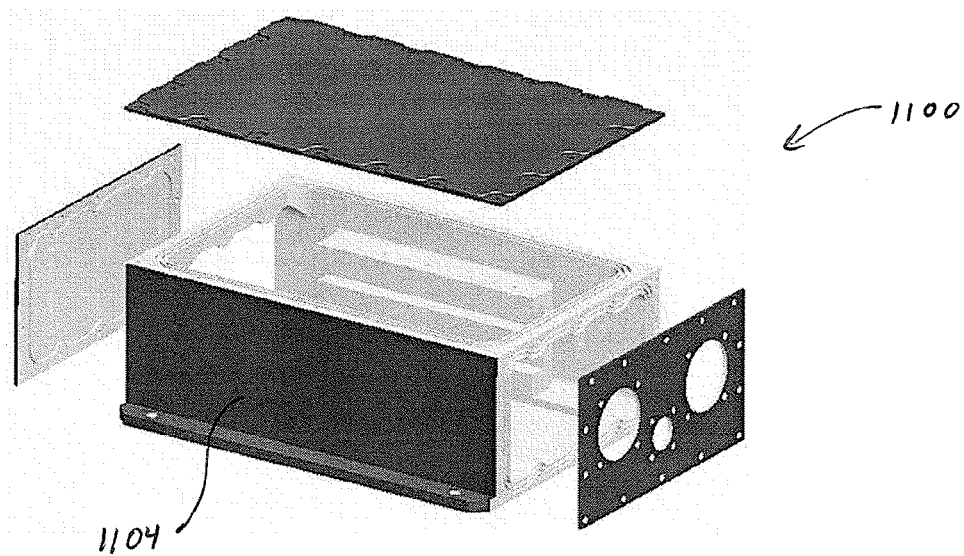
FIG. 11 depicts a partially exploded perspective view of a network switch (e.g., a matrix switch) for use with embodiments of the present imaging systems.

Referring now to FIG. 11, a partially exploded perspective view is shown of a matrix switch 1100 that is suitable for use with embodiments of processing units of the present imaging systems. In general, matrix switch 1100 is configured to provide video buffering and/or routing of up to 16 composite video inputs to up to 4 independent user displays on a non blocking basis. Routing selection can be accomplished using binary discretes, binary coded decimal, and/or serial commands via, for example, RS-232/422 or ethernet cables. In addition to the routing functionality, the matrix switch can also be configured to overlay simple graphics and/or text onto each of the video sources (e.g., via a video inserter). The matrix switch can also comprise include two quad processors that use the first 8 video inputs to produce two composite video outputs. The quad processor can be configured to scale and combine video inputs to produce a single composite video output with a user selected choice of 16 different display presentations. In the embodiment, shown matrix switch 1100 comprise a dual-3U-slot chassis (housing) 1104 and is configured as a 16×4 matrix switch. In some embodiments, matrix switch 1100 comprises one or more quad processor (e.g., a µFourSight Quad Processor, available from Ovation) configured to split a coupled display such that the display can simultaneously show up to four individual images (or four individual portions of the image model). In some embodiments, the matrix switch has a power supply (e.g., voltage regulator) using standard or modified OTS components, and/or is configured to consume power at a rate of less than four watts. In some embodiments, the matrix switch complies with MIL-STD-1275 and/or MIL-STD-461. In some embodiments, the matrix switch is configured to be substantially free of Hexavalent Chromium and/or Cadmium.

Figure 12:
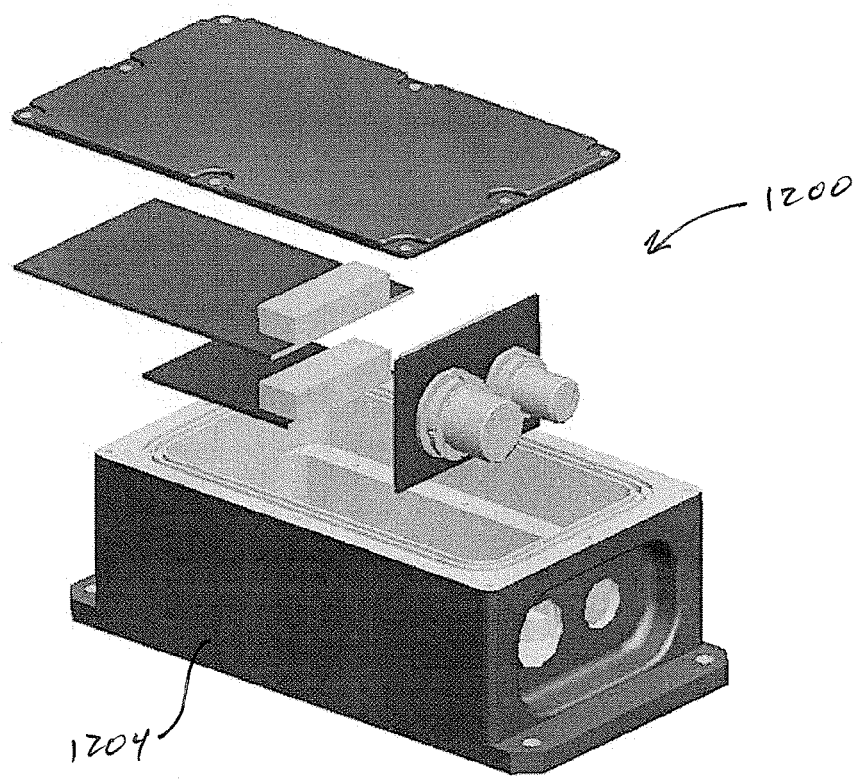
FIG. 12 depicts a partially exploded perspective view of a frame grabber for use with embodiments of the present imaging systems.

Referring now to FIG. 12, a partially exploded perspective view is shown of a frame grabber 1200 that is suitable for use with embodiments of the present imaging systems. In the embodiment, shown frame grabber 1200 comprise a sealable (and/or sealed), conduction-cooled chassis (housing) 1204. The frame grabber is configured to be coupled to one or more of the imaging sensors (e.g., two, three, four, five, six, or more imaging sensors), such as, for example, via a cable and/or another component of the imaging system. In some embodiments, the frame grabber is configured to receive images in a composite video format and to output images in a GigE Vision format. Suitable GigE Vision technology can be licensed from Pleora. In some embodiments, such licensed technology can be modified for conduction cooling, to withstand higher temperatures, to comply with MIL-STD-461, and/or to include selectable serial control functionality. In some embodiments, the frame grabber is configured to support or function with NTSC and/or PAL video standards. In some embodiments the frame grabber comprises a suitable number of multiplexed video inputs, e.g., six multiplexed video inputs. In some embodiments, the frame grabber is configured to be substantially free of Hexavalent Chromium and/or Cadmium. In some embodiments, the frame grabber is configured to be capable of communicating with a serial server and/or a RS-232/RS-422 selectable camera control. In some embodiments, the frame grabber is configured to support real-time or substantially real-time streaming of video.

Figure 13A:
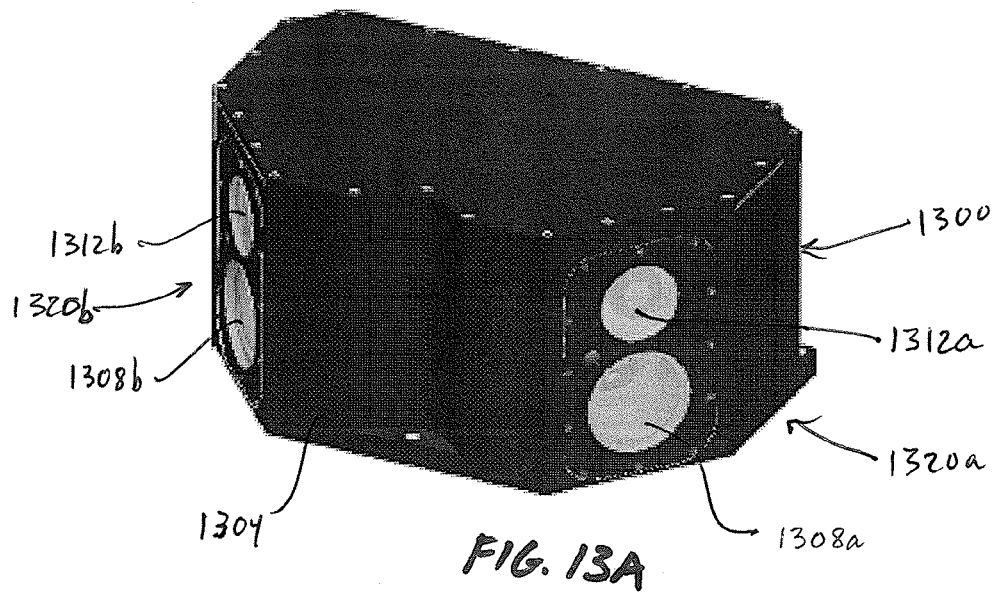
FIGS. 13A-13D depict various views of two embodiments of sensor pods for use with embodiments of the present imaging systems.
Figure 13B:
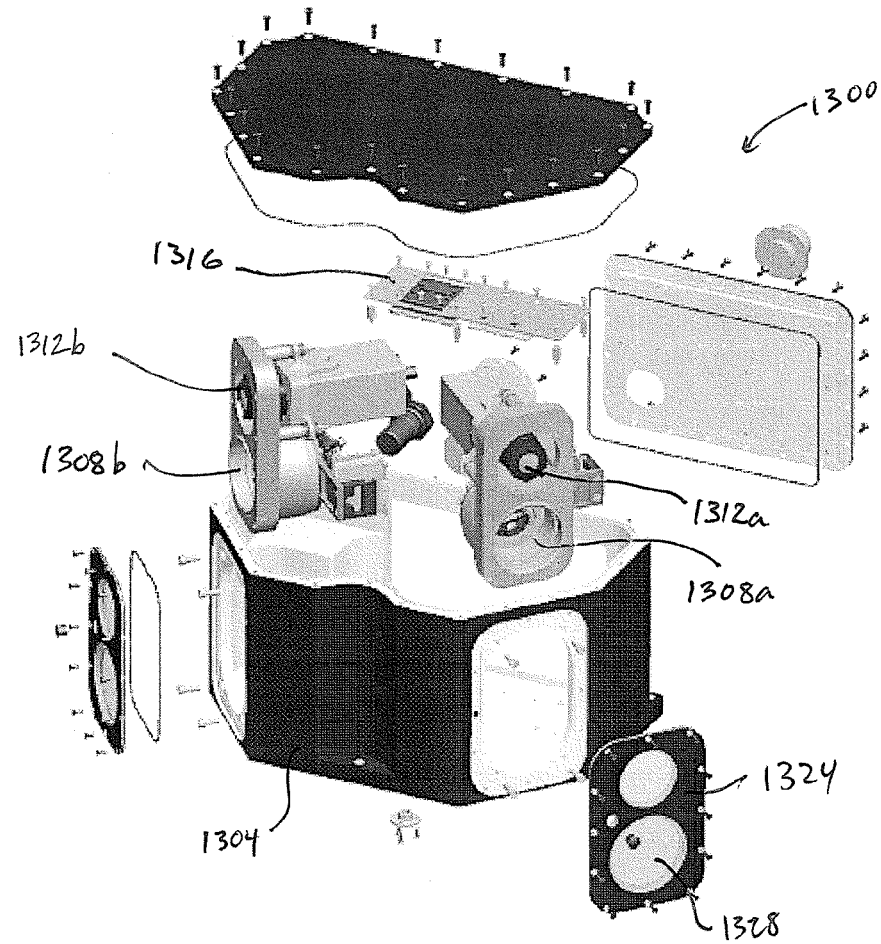

Referring now to FIGS. 13A and 13B, perspective and exploded views, respectively, are shown of a sensor pod 1300 for use with embodiments of the present imaging systems. Sensor pod 1300 is similar in some respects to sensor pods 18 of FIGS. 1 and 2, and any elements or functionality of sensor pods 18 can be incorporated into sensor pod 1300 and/or any elements or functionality of sensor pod 1300 can be incorporated into sensor pods 18. In the embodiment shown, sensor pod 1300 comprises a housing 1304, a first imaging sensor 1308*a* coupled to the housing, and a second imaging sensor 1312*a* coupled to the housing. First imaging sensor 1308*a* has a first spectrum, and second imaging sensor 1312*a* has a second spectrum. Second imaging sensor 1312*a* is coupled to the housing 1304 in fixed relation to first imaging sensor 1308*a* such that the FOV of second imaging sensor 1312*a* is substantially aligned with the FOV of first imaging sensor 1308*a*. In the embodiment shown, the sensor pod further comprises a processing unit 1316 disposed within the housing and configured to receive images from the first and second imaging sensors 1308*a* and 1312*a* and to generate an image model in substantially real-time by fusing images from the first and second imaging sensors.

In the embodiment shown, the sensor pod also comprises another first imaging sensors 1308*b* coupled to the housing in fixed relation to first imaging sensor 1308*a* such that the FOV of first imaging sensor 1308*b* partially overlaps the FOV of first imaging sensor 1308*b*. Processing unit 1316 is further configured to receive images from the two first imaging sensors 1308*a* and 1308*b* and to generate an image model in substantially real-time by warping and stitching images from the first imaging sensors 1308*a* and 1308*b*.

In the embodiment shown, the sensor pod also comprises another second imaging sensors 1312*b* coupled to the housing in fixed relation to first imaging sensor 1312*a* such that the FOV of second imaging sensor 1312*b* partially overlaps the FOV of second imaging sensor 1312*b*. Processing unit 1316 is further configured to receive images from the two second imaging sensors 1312*a* and 1312*b* and to generate an image model in substantially real-time by warping and stitching images from the first imaging sensors 1312*a* and 1312*b*. As described above for first and second imaging sensors 1308*a* and 1312*a*, second imaging sensor 1312*b* is coupled to the housing in fixed relation to first imaging sensor 1308*b* such that the FOV of second imaging sensor 1312*b* is substantially aligned with the FOV of first imaging sensor 1308*b*. In this way, the sensor pod shown has two sets 1320*a* and 1320*b* of imaging sensors, with each set comprising one first imaging sensor and one second imaging sensor). In the embodiment shown, the combined FOV of first and second imaging sensors 1308*a* and 1312*a* is spaced apart from the combined FOV of first and second imaging sensors 1308*b* and 1312*b* by a distance of about 9 inches (e.g., a blind spot that is about 9 inches wide) at the sensor pod (at the apertures of the imaging sensors), but the distance between the respective combined FOVs decreases to zero (they intersect) at a distance of about 16 feet from the vehicle.

Additionally, in the embodiment shown, processing unit 1316 is further configured to receive images from the first imaging sensors 1308*a* and 1308*b* and from the second imaging sensors 1312*a* and 1312*b*, and to generate an image model in substantially real-time by: (a) warping images from corresponding first and second imaging sensors; (b) fusing images from corresponding first and second imaging sensors; and (c) stitching images from imaging sensors with partially overlapping FOVs. In other embodiments, the sensor pod can comprise any suitable number of first and/or second imaging sensors, (e.g., two first imaging sensors and no second imaging sensors, one first imaging sensor and one second imaging sensor, two first imaging sensors and two second imaging sensors and two third imaging sensors, or the like); and any suitable number of sets of imaging sensors. In other embodiments the processing unit can be omitted from the pod.

In the embodiment shown, the combined horizontal FOV (hFOV) of the sensor pod (of the imaging sensors of the sensor pod) is 197 degrees. More specifically, the imaging sensors of the first set 1320*a* have a hFOV of 100 degrees and the imaging sensors of the second set 1320*b* have a hFOV of 100 degrees, and the hFOV of the first set partially overlaps the hFOV of the second set 1320*b* by about three (3) degrees. In other embodiments, partially overlapping FOVs can overlap by about any suitable degree, such as, for example, 1, 2, 3, 4, 5, 6, 7, 8, 9, 10, 15, 20 degrees, or the like, so long as each FOV primarily includes a different region. Stated another way, the alignment of first set 1320*a* is angularly offset from the alignment of second set 1320*b* by about 97 degrees.

In the embodiment shown, the first imaging sensors comprise MIM500X IR sensors each with a 100-degree hFOV, and the second imaging sensors comprise CCD color cameras with a 100-degree hFOV. In the embodiment shown, housing 1304 has a height of 7.165 inches, a width of 13.75 inches, and a depth of 8.75 inches. In other embodiments, the housing can have a height, width, or depth of any suitable dimension, such as, for example, less than, equal to, or between any of about: 5, 5.5, 6, 6.5, 7, 7.5, 8, 8.5, 9, 9.5, 10, 10.5, 11, 11.5, 12, 13, 14, 15, 16, 17, 18, 19, 20 inches, or more. In some embodiments, the housing can comprise aluminum and have a weight of about 21.6 pounds. In the embodiment shown, the sensor pod is configured to receive electrical power from a 28 volt direct current source, and the processing unit can comprise voltage regulators and the like to distribute electrical power to the imaging sensors and/or processing unit at suitable voltages.

In the embodiment shown, the housing comprises a window plate 1324 having one or more lenses 1328 corresponding to each set of imaging sensors. In some embodiments, the sensor pod comprises heaters that are thermally coupled to the window plates 1324 to reduce or eliminate fogging and the like. In some embodiments, the sensor pod is configured to comply with MIL-STD-1275.

Figure 13C:
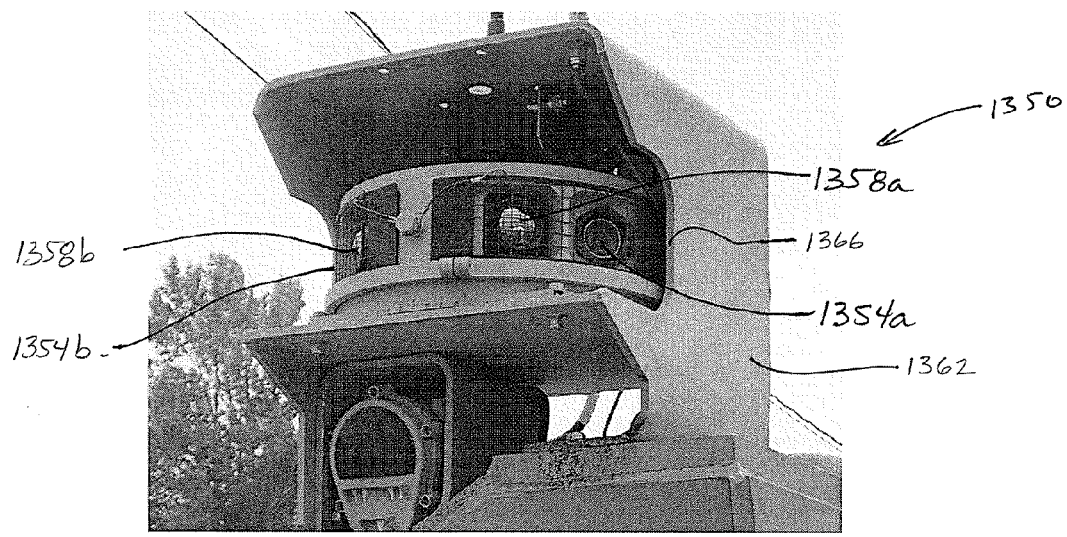
Figure 13D:
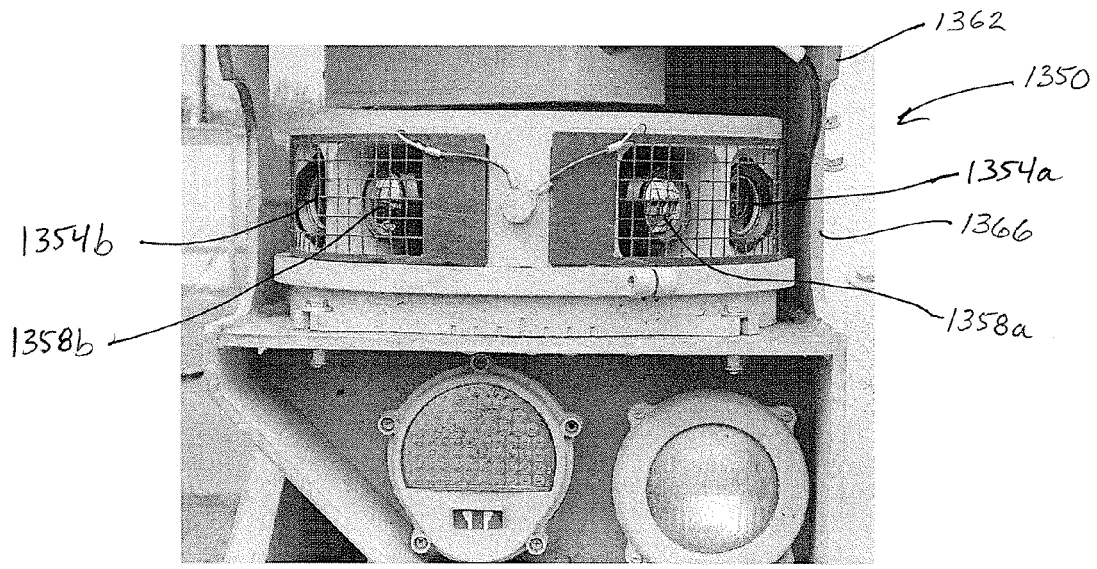

FIGS. 13C and 13D depict perspective and front views, respectively, of another embodiment of a sensor pod 1350 that is similar to sensor pod 1300, with the primary exception that corresponding first and second imaging sensors (e.g., 1354*a* and 1358*a*) are horizontal offset from one another, rather than vertically offset (as in sensor pod 1300 of FIGS. 13A-13B). Sensor pod 1350 is shown with an armored shield 1362 surrounding a portion of the sensor pod. Armored shield 1362 has side cutouts 1366 such that the armored shield does not obstruct the FOVs of the imaging sensors in the sensor pod.

Figure 14A:
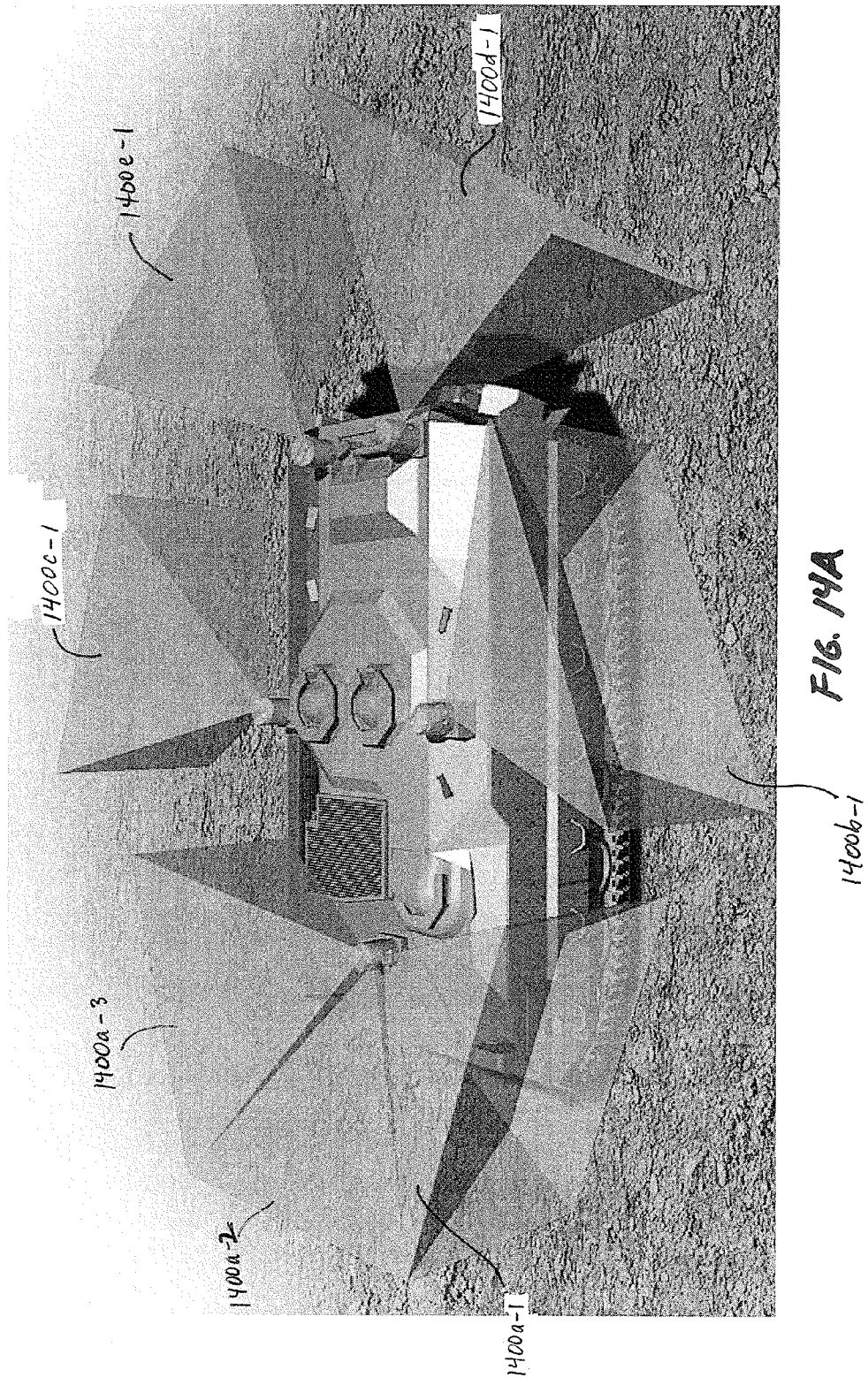
FIGS. 14A-14C depict fields-of-view (FOVs) for various cameras in one embodiment of the present imaging systems coupled to a vehicle.
Figure 14B:
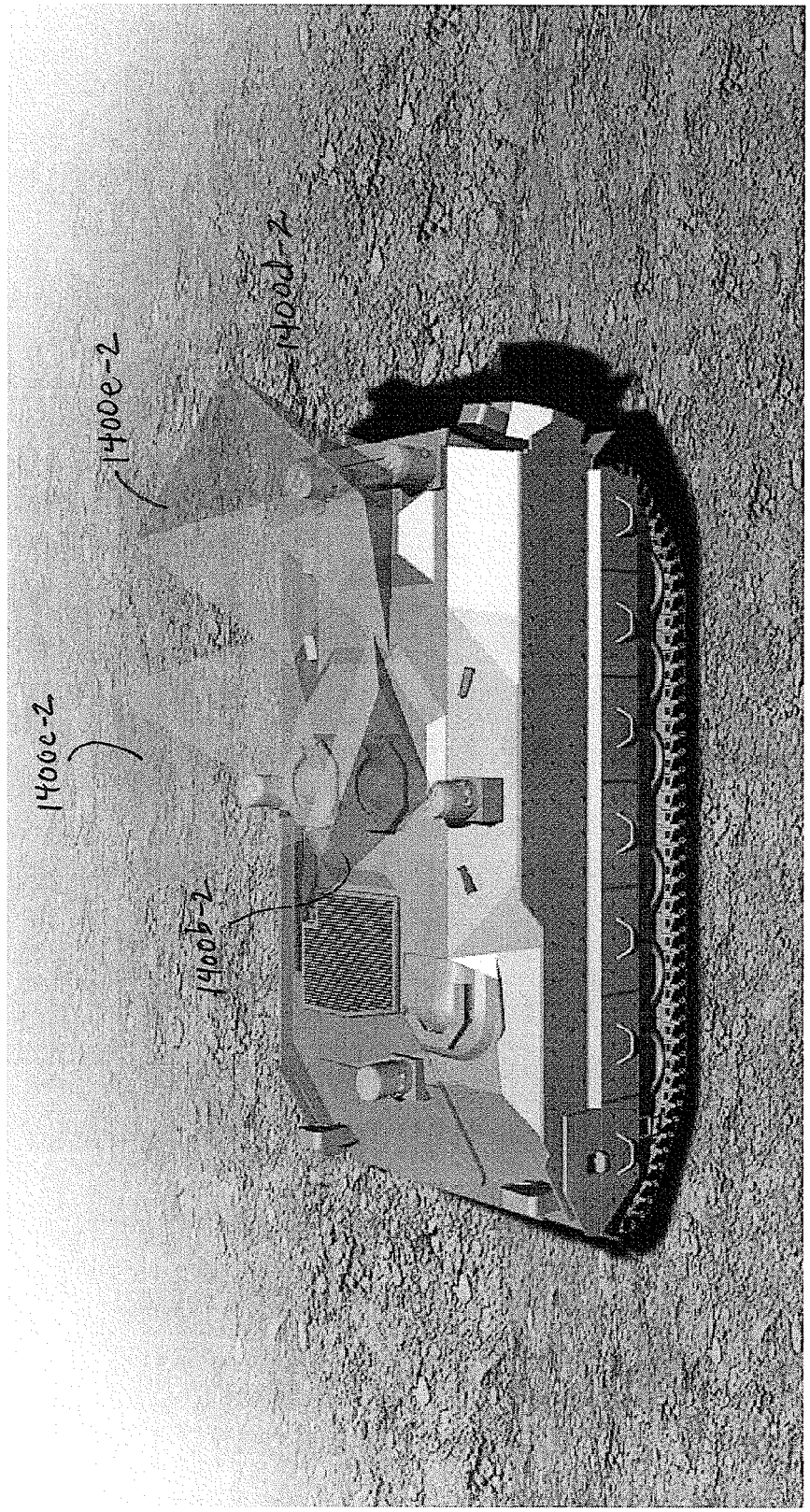
Figure 14C:
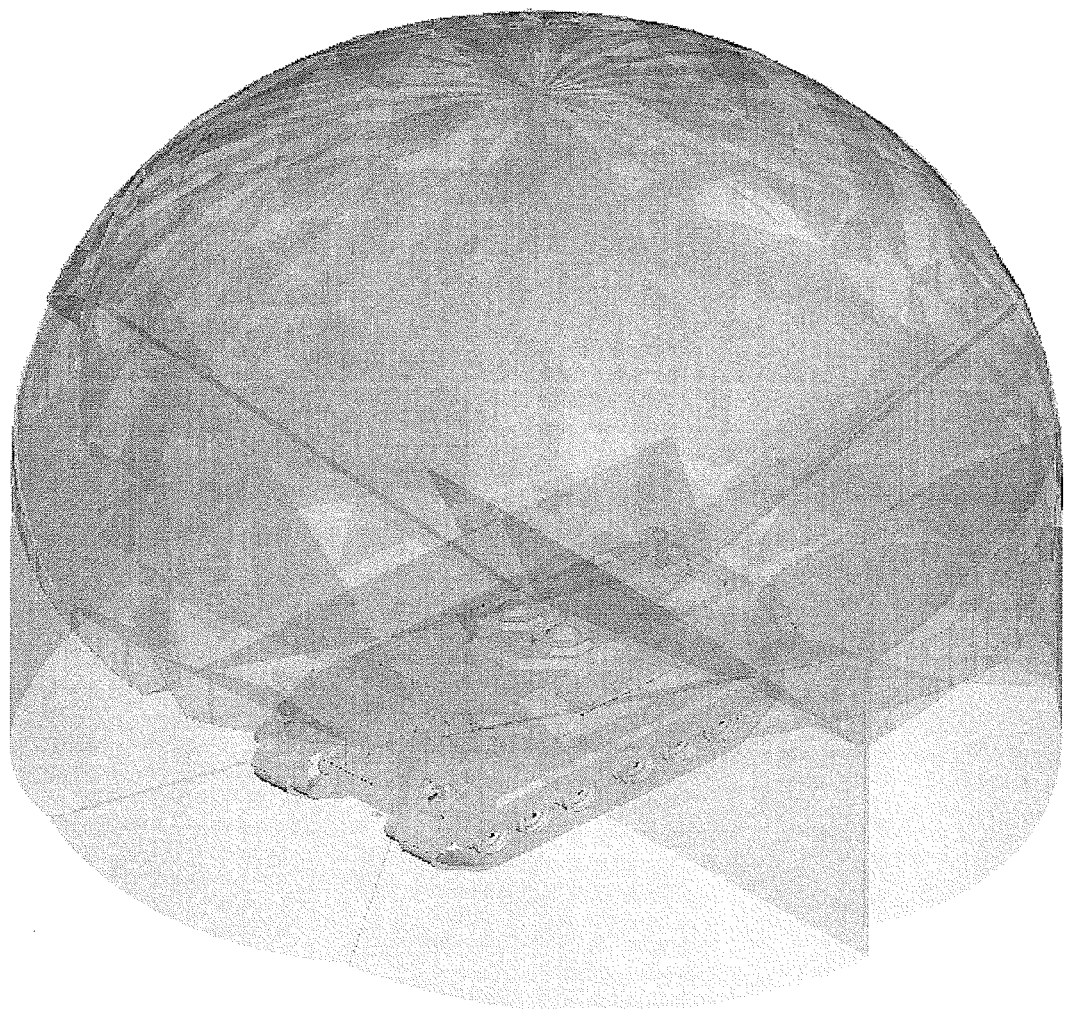

Referring now to FIGS. 14A-14C, fields-of-view (FOVs), are illustrated for various cameras in one embodiment of the present imaging systems coupled to a vehicle. In the embodiment shown, a vehicle 14 comprises five sensor pods (e.g., 18 or 1300) coupled to the vehicle. In the embodiment shown, the vehicle comprises a forward sensor pod having three azimuth sets of imaging sensors with three corresponding azimuth slices 1400*a*-1, 1400*a*-2, 1400*a*-3; two side sensor pods each having one azimuth set of imaging sensors with a corresponding azimuth slice 1400*b*-1, 1400*c*-1; and two rear sensor pods each having one set of azimuth imaging sensors with a corresponding azimuth image slice 1400*d*-1, 1400*e*-1. In the embodiment shown, each of the side and rear sensor pods also comprise an upward set of imaging sensors with a corresponding upward slice 1400*b*-2, 1400*c*-2, 1400*d*-2, 1400*e*-2. As shown in FIG. 14C, the seven azimuth slices and the four upward slices overlap one another at a distance from the vehicle such that images from each of the images slices can be stitched together into a continuous hemispherical image model (e.g., 550 of FIG. 5B).

In the embodiment shown, the slices (e.g., 1400*a*-1, 1400*a*-2) may overlap at a certain distance from the vehicle and may be spaced apart by a distance at the vehicle (e.g., at the imaging sensors or aperture of the imaging sensors). That is, if overlapping sensors are disposed a distance away from one another on the vehicle, but their respective slices converge as they move away from the vehicle, but the FOVs are still "overlapping" as that term is used in this disclosure. For example, FOVs of such sensors may overlap at a distance of between 1 and 20 feet from the vehicle, such as, for example, greater than, less than, between, or at, any of about: 1, 2, 3, 4, 5, 6, 7, 8, 9, 10, 11, 12, 13, 14, 15, 16, 17, 18, 19, 20, and the like. In this way, at or beyond the distance at which the two adjacent FOVs overlap, the images from their respective imaging sensors can be warped and stitched together. In some embodiments, the processing unit is configured to stitch images from the sensors at a distance from the vehicle at which the FOVs overlap. In some embodiments, where overlapping imaging sensors are spaced apart at the vehicle such that their FOVs do not overlap at the vehicle, the space between the imaging sensors at the vehicle can be small enough that an object (such as a human or another vehicle) cannot hide in the space between the FOVs without at least a portion of the object appearing in at least one of the FOVs. For example, in some embodiments any two such imaging sensors can be disposed or coupled to the vehicle such that the undetected space at the vehicle is less than any of about: 24 inches, 18 inches, 12 inches, 10 inches, 8 inches, 6 inches, 2 inches, or the like.

In contrast non-overlapping FOVs have edges or boundaries that are parallel or divergent such that they do not, at any distance from the vehicle, overlap or intersect. In embodiments where the imaging system comprises two non-overlapping imaging sensors, each having a field-of-view (FOV) and configured to be coupled to a vehicle such that the FOV is spaced by a distance from the FOV of the other imaging sensor, the processing unit can be configured such that the display can show simultaneously a portion of images from each imaging sensor such that the portions are spaced apart by a distance that is proportional to the distance between the FOVs of the imaging sensors. For example, the display can simultaneously show images from each imaging sensor with an empty space between the non-overlapping images is proportional to the space actually between the FOVs (e.g., where the space between FOVs is 10 inches, and the display shows the images at ⅒ of actual size, the display shows a 1-inch space between the non-overlapping images.

Figure 15:
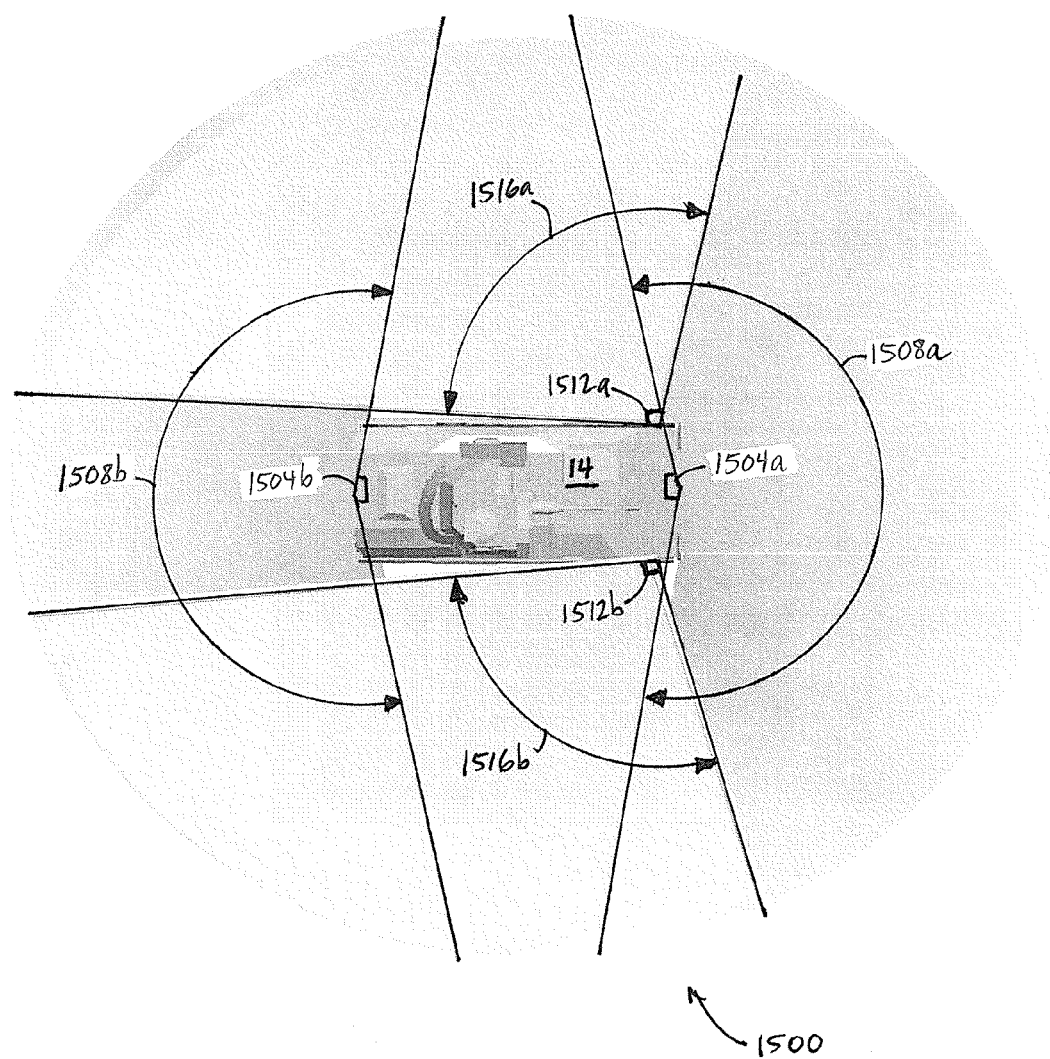
FIG. 15 depicts FOVs for certain cameras in another embodiment of the present imaging systems.

Referring now to FIG. 15, FOVs are shown for certain imaging sensors in another embodiment of the present imaging systems. In the embodiment shown, an imaging system coupled to a vehicle 14 such that the imaging system 1500 comprises a forward sensor pod 1504*a* (e.g., sensor pod 1300) and a rear sensor pod 1504*b* (e.g., sensor pod 1300). Forward sensor pod 1504a comprises a plurality (two or more) imaging sensors having a combined forward FOV (or combined forward slice) 1508*a* of about 200 degrees (e.g., 197 degrees). Rear sensor pod 1504*b* comprises a plurality (two or more) imaging sensors having a combined rear FOV (or combined rear slice) 1508*b* of about 200 degrees (e.g., 197 degrees). In other embodiments, front and rear combined FOVs 1508*a* and 1508*b*, respectively, can have any suitable size (or angular sweep), such as, for example, greater than, equal to, or between any of about: 160, 170, 180, 190, 200, 210, 220, or more degrees. Similarly, one or both of sensor pods 1504*a* and 1504*b* can be replaced with one or more individual imaging sensors coupled to the vehicle in a suitable configuration. In the embodiment shown, imaging system 1500 also comprises a left imaging sensor or sensor pod 1512*a* and a right imaging sensor or sensor pod 1512*b*. Each of left and right imaging sensors or sensor pods have a FOV (or slice) 1516*a* or 1516*b*, respectively, (e.g., a combined FOV or slice, if a sensor pod comprising a plurality of imaging sensors) that faces rearward and outward from each side of the vehicle. In the embodiment shown, images captured by the imaging sensors of forward sensor pod 1504*a* can be warped, stitched, and/or fused into a forward image model; images captured by the imaging sensors of rear sensor pod 1504*b* can be warped, stitched, and/or fused into a rear image model; images captured by left imaging sensor or sensor pod 1512*a* can be warped, stitched, and/or fused into a left side image model; and/or images captured by right imaging sensor or sensor pod 1512*b* can be warped, stitched, and/or fused into a right side image model. In some embodiments, side imaging sensors or sensor pods 1512a and 1512b can be disposed facing forward at rear side corners of a vehicle such that their respective FOVs face forward and outward relative to the vehicle. A display 26 coupled to the embodiment of imaging system 1500 depicted in FIG. 15 can be configured to show (and/or the system can be configured such that the display can show) simultaneously forward images, side images, and rear images, as depicted in FIG. 9. For example, imaging system 1500 can be configured such a coupled display can simultaneously show a portion (up to all) of a forward image model, a portion (up to all) of a rear image model, and a portion (up to all) of each of a left and side image or image model.

Referring now to FIGS. 16-22, schematic views are shown of various configurations of the present imaging systems. Various embodiments of the present imaging systems can incorporate any elements or functionality described with reference to FIGS. 16-22 and/or any elements or functionality described elsewhere in this disclosure. In some embodiments, the configuration of sensor pods, imaging sensors, FOVs, slices and the like are indicative of their configuration or position relative to a vehicle to which the imaging systems are coupled, with the top of each of FIGS. 16-22 corresponding to the front of such a vehicle.

Figure 16:
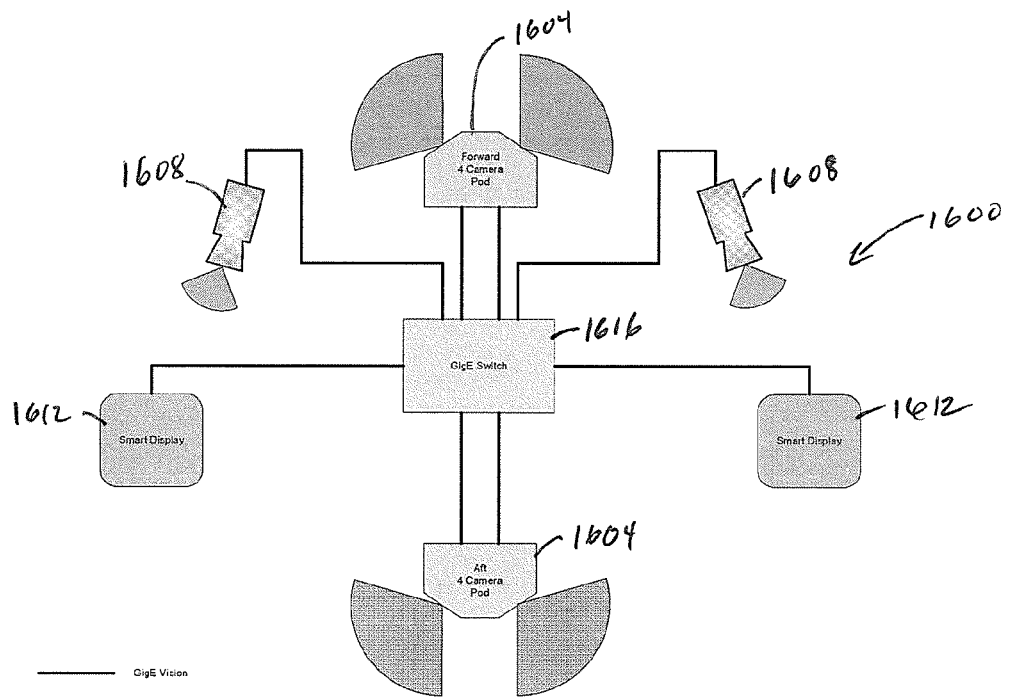
FIGS. 16-22 depict schematic views of various configurations of the present imaging systems.

FIG. 16 depicts a smart-display architecture (Smart Disp) for an imaging system 1600 comprising: two sensor pods 1604 each having two sets of first and second imaging sensors for capturing images for two slices; two side imaging sensors or sensor pods 1608 each for capturing images for a single slice; two smart displays 1612 that include processing units configured to process images; and a GigE switch 1616 for routing images from the sensor pods or imaging sensors to the smart displays (e.g., via GigE Vision cables).

Figure 17:
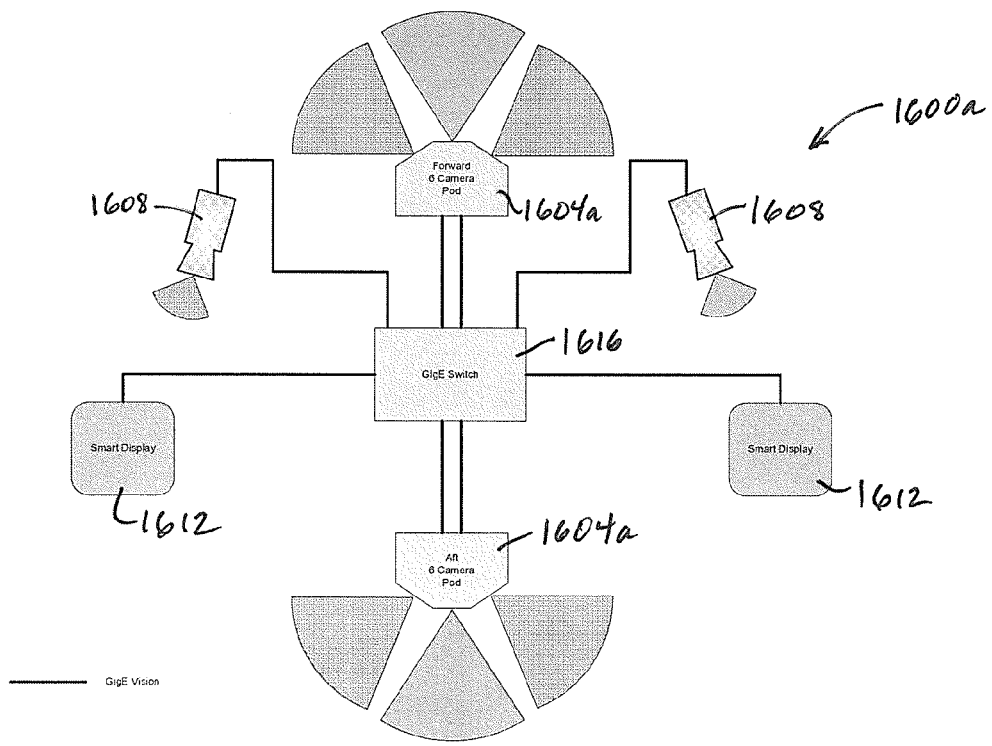

FIG. 17 depicts a alternate smart-display architecture (Smart Disp Alt 1) for an imaging system 1600a comprising: two sensor pods 1604a each having three sets of first and second imaging sensors for capturing images for three slices; two side imaging sensors or sensor pods 1608 each for capturing images for a single slice; two smart displays 1612 that include processing units configured to process images; and a GigE switch 1616 for routing images from the sensor pods or imaging sensors to the smart displays (e.g., via GigE Vision cables).

Figure 18:
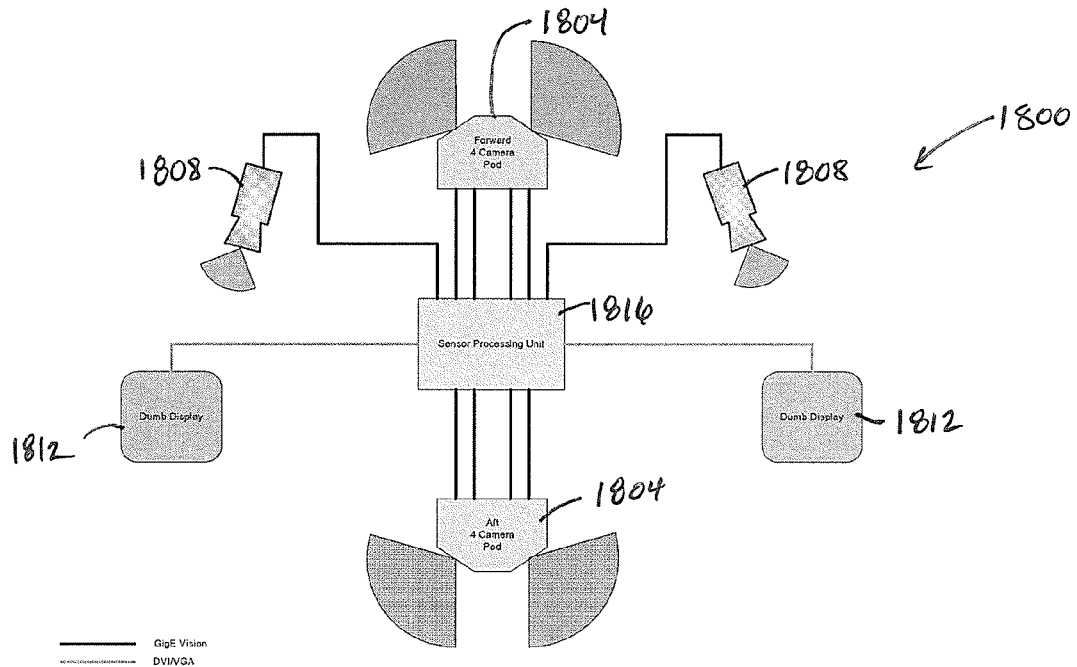

FIG. 18 depicts a dumb-display architecture (Dumb Disp) for an imaging system 1800 comprising: two sensor pods 1804 each having two sets of first and second imaging sensors for capturing images for two slices; two side imaging sensors or sensor pods 1808 each for capturing images for a single slice; two dumb displays 1812 that do not include processing units; and a processing unit 1816 configured to receive images from the sensor pods or imaging sensors (e.g. via GigE Vision cables), process images (e.g., generate an image model), and output portions (up to all) of the image model to the dumb displays (e.g., via DVI or VGI cables).

Figure 19:
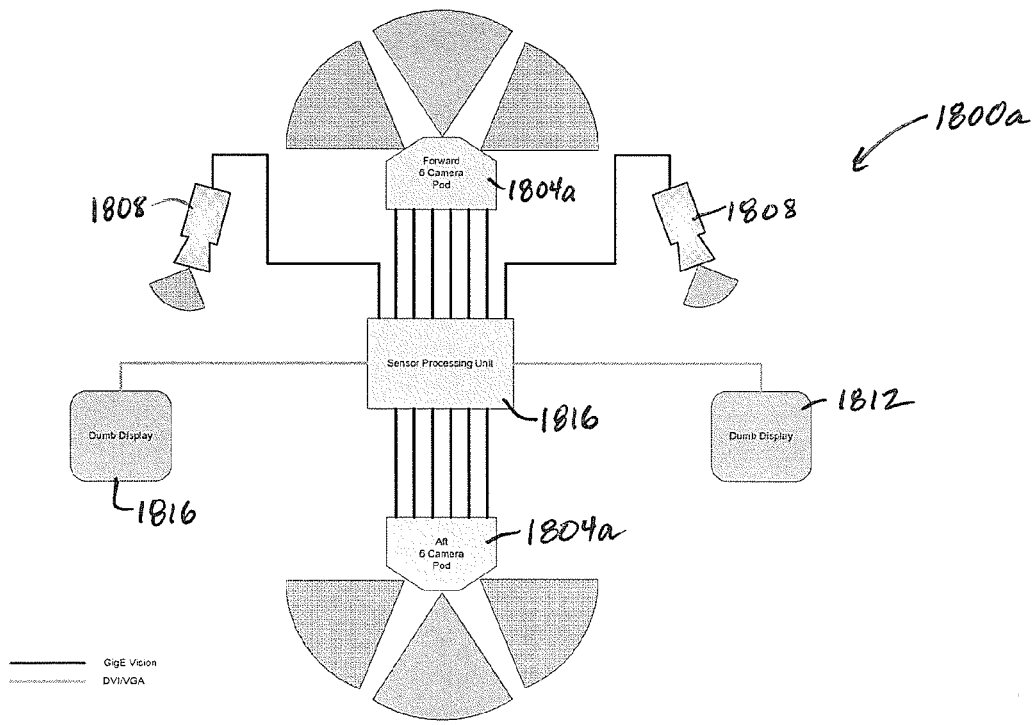

FIG. 19 depicts a first alternate (Dumb Disp Alt 1) dumb-display architecture for an imaging system 1800a comprising: two sensor pods 1804a each having three sets of first and second imaging sensors for capturing images for three slices; two side imaging sensors or sensor pods 1808 each for capturing images for a single slice; two dumb displays 1812 that do not include processing units; and a processing unit 1816 configured to receive images from the sensor pods or imaging sensors (e.g. via GigE Vision cables), process images (e.g., generate an image model), and output portions (up to all) of the image model to the displays (e.g., via DVI or VGI cables).

Figure 20:
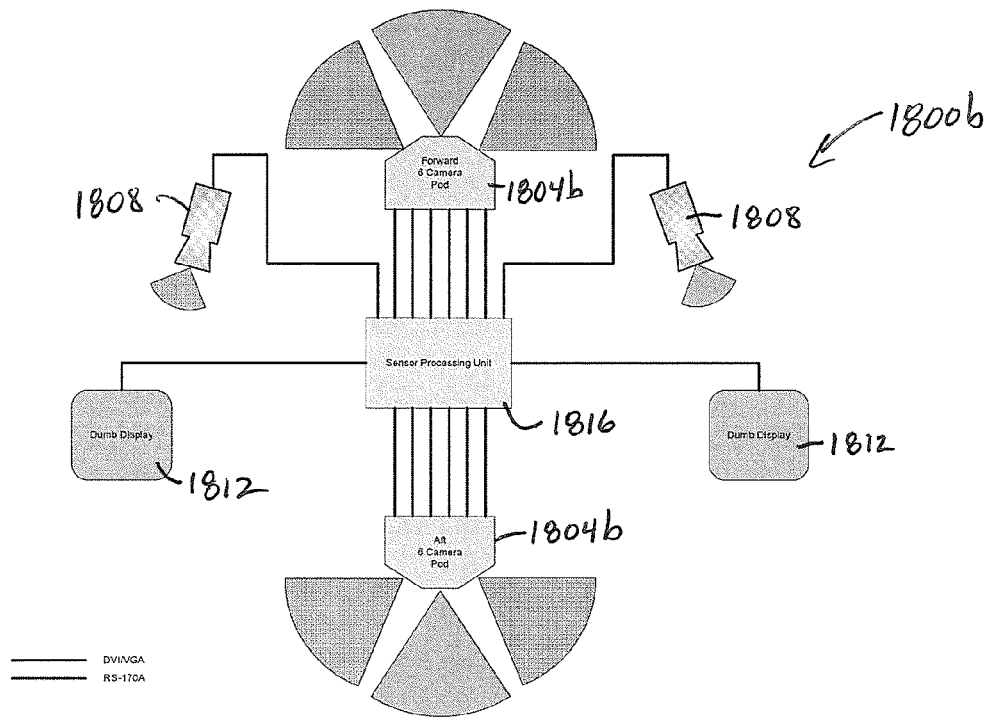

FIG. 20 depicts a second alternate dumb-display architecture (Dumb Disp Alt 2) for an imaging system 1800b comprising: two sensor pods 1804b each having three sets of first and second imaging sensors for capturing images for three slices; two side imaging sensors or sensor pods 1808 each for capturing images for a single slice; two dumb displays 1812 that do not include processing units; and a processing unit 1816 configured to receive images from the sensor pods or imaging sensors (e.g. via GigE Vision cables), process images (e.g., generate an image model), and output portions (up to all) of the image model to the dumb displays (e.g., via RS-170A cables).

Figure 21:
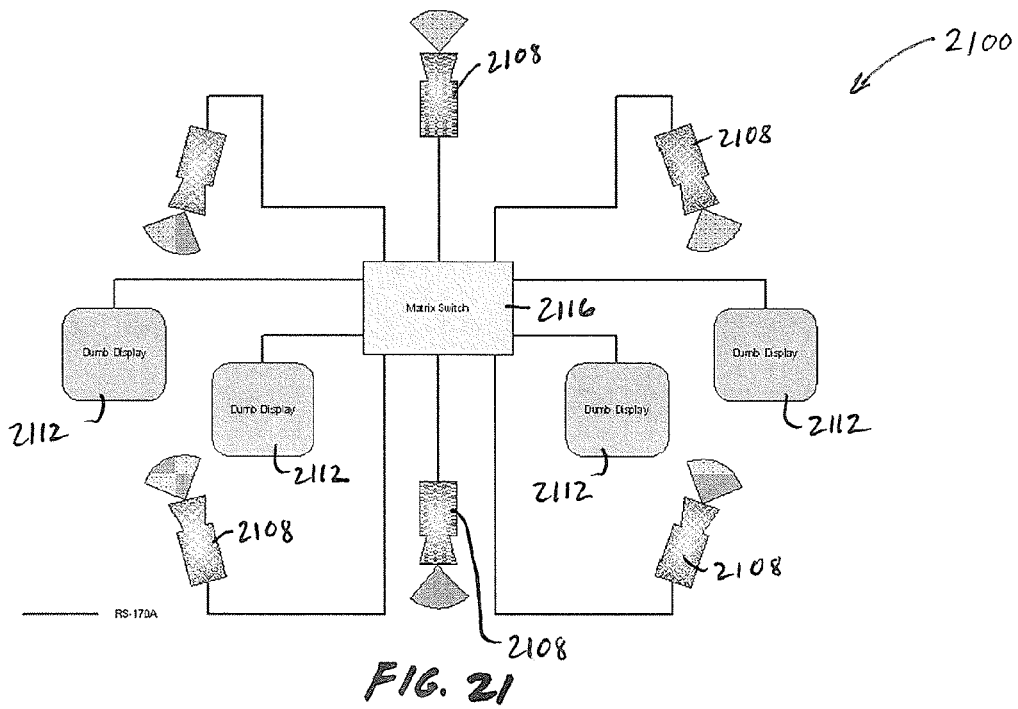

FIG. 21 depicts a matrix switch architecture (Matrix Switch) for an imaging system 2100 comprising: six sensor pods or imaging sensors 2108 each for capturing images from a single slice; four dumb displays 2112; and a matrix switch 2116 including an image processing unit or otherwise configured to generate an image model and to output a portion (up to all) of the image model to each of the four dumb displays (e.g., via RE-170A cables).

Figure 22:
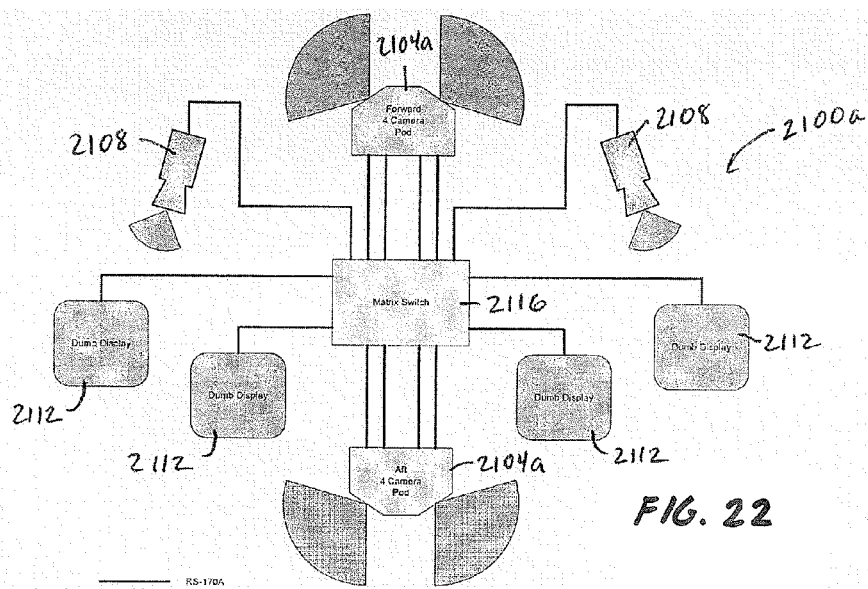

FIG. 22 depicts and alternate matrix switch architecture for an imaging system 2100a two sensor pods 2104 each having two sets of first and second imaging sensors for capturing images for two slices; two side imaging sensors or sensor pods 2108 each for capturing images for a single slice; four dumb displays 2112 that do not incorporate processing units; and a matrix switch 2116 including an image processing unit or otherwise configured to generate an image model and to output a portion (up to all) of the image model to each of the four dumb displays (e.g., via RE-170A cables.

Table 2 includes example specifications for various aspects and/or elements of the embodiments depicted in FIGS. 16-22.

TABLE 2

Example Specifications for Imaging System Embodiments of FIGS. 16-22

| | Smart Disp | Smart Disp Alt 1 | Dumb Disp | Dumb Disp Alt 1 | Dumb Disp Alt 2 | Matrix |
|---|---|---|---|---|---|---|
| Pod FoV | 194° | 180° | 194° | 180° | 180° | 194° |
| Bandwidth | 360 Mb/S | 480 Mb/S | 180 Mb/S | 180 Mb/S | 18 MHz | 12 MHz |
| | 540 Mb/S | 810 Mb/S | 270 Mb/S | 270 Mb/S | 18 MHz | 12 MHz |
| Aggregate Resolution | 2048 × 768 | 3072 × 768 | 1024 × 768 | 1024 × 768 | 640 × 480 | 640 × 480 |
| Latency | Depends on Display | Depends on Display | <80 ms | <80 ms | <80 ms | <60 ms |

Referring now to FIGS. 23-29, schematic views are shown of various embodiments of sensor pods for use with the present imaging systems. Various embodiments of sensor pods can incorporate any elements or functionality described with reference to FIGS. 23-29 and/or any elements or functionality described elsewhere in this disclosure.

Figure 23:
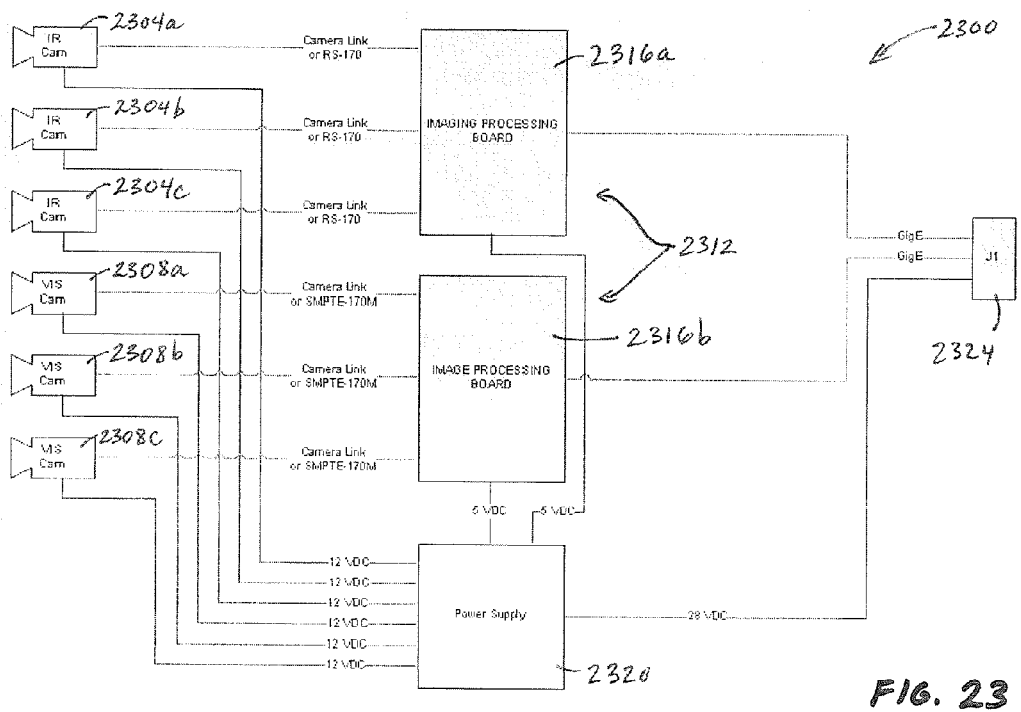
FIGS. 23-29 depict schematic views of various embodiments of sensor pods for use with the present imaging systems.

FIG. 23 depicts a schematic of a six-camera sensor pod 2300 having three sets of first and second imaging sensors for capturing images for three slices. More specifically, sensor pod 2300 comprises: three IR first imaging sensors 2304a, 2304b, 2304c; three visible-spectrum (Vis) second imaging sensors 2308a, 2308b, 2308c; and a processing unit 2312 coupled to the IR imaging sensors. As described above, the sensor pod can be configured such that the FOV of each IR imaging sensor (e.g., 2304a) is substantially aligned with the FOV of a corresponding Vis imaging sensors (e.g., 2308a); and/or can be configured such that the FOV each corresponding set of imaging sensors (e.g., 2304a and 2308a) partially overlaps the FOV of another set of imaging sensors (e.g., 2304b and 2308b). Processing unit 2312 is configured to receive images from the imaging sensors and to warp and/or stitch the images (e.g., as described above with reference to FIG. 3). Processing unit 2312 comprises a first image processing board 2316a and a second image processing board 2316b. The IR imaging sensors are coupled to the first image processing board 2316a and the Vis imaging sensors are coupled to the second image processing board 2316b. In this way, images from the IR imaging sensors can be warped and/or stitched into a combined image (or small image model), and separately images from the Vis imaging sensors can be warped and/or stitched into combined images (or small image model). In this way, IR combined images and Vis combined images can be output from sensor pod 2300 separately such that they can be fused with other IR and Vis images, respectively, prior to being fused; or can be fused and/or displayed separately at a display. The IR imaging sensors can be coupled to the first image processing board with, for example, Camera Link or RS-170 cables. The Vis imaging sensors can be coupled to the second image processing board with, for example, Camera Link or SMPTE-170M cables. Sensor pod 2300 can further comprise a power supply 2320, such as a voltage regulator, to receive power (e.g., 28V DC) and distribute (e.g., via any suitable cables) power to the imaging sensors (e.g., 12V DC) and the image processing boards (e.g., 5V DC). In the embodiment shown, sensor pod 2300 further comprises a connector 2324 for removably coupling the sensor pod to a display, network switch, central processor, or any other suitable hardware. Connector 2324 can be coupled to the image processing boards with GigE vision cables, and to the power supply with any suitable cables.

Figure 24:
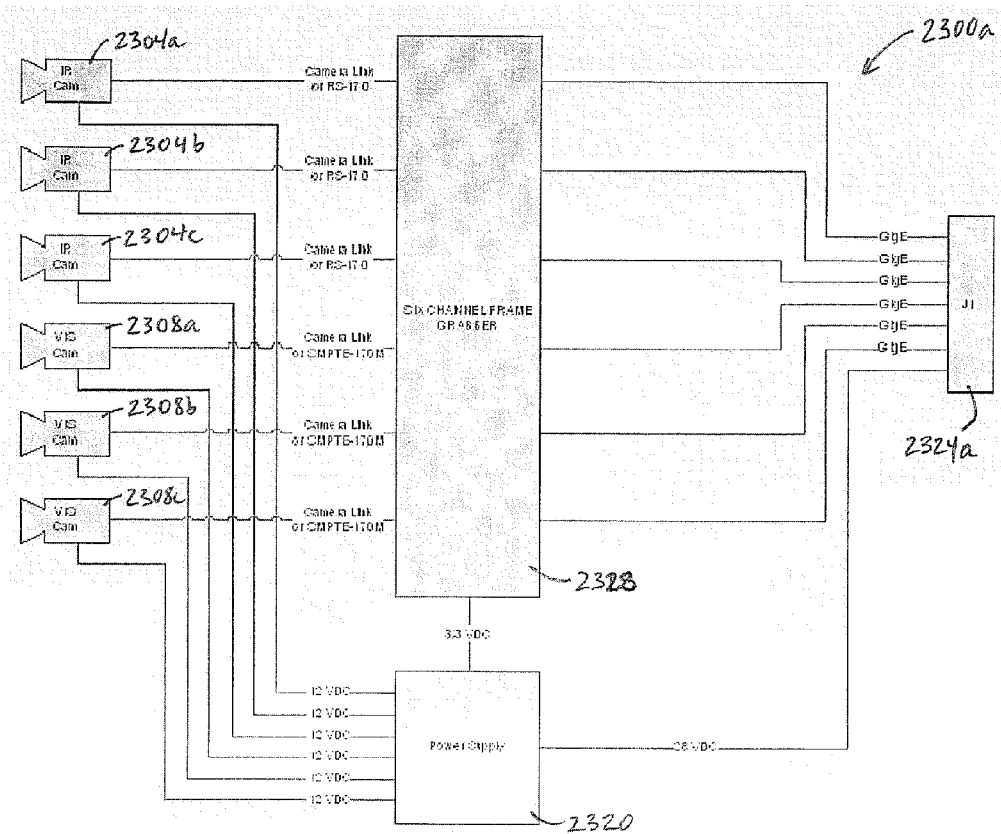

FIG. 24 depicts a schematic of an alternate embodiment of a six-camera sensor pod 2300a having three sets of first and second imaging sensors for capturing images for three slices. Sensor pod 2300a is similar in some respects to sensor pod 2300 of FIG. 23, and the differences will therefore be primarily described here. Instead of a processing unit, sensor pod 2300 comprises a frame grabber 2328 having six channels and configured to "grab" and output images from each imaging sensor, such that warping, stitching, and fusing can be completed remotely from the sensor pod. The frame grabber can be coupled to connector 2324a via six GigE vision cables. In such an embodiment, power supply 2320 can be configured to provide a power at a voltage suitable for the frame grabber (e.g., 3.3V DC).

Figure 25:
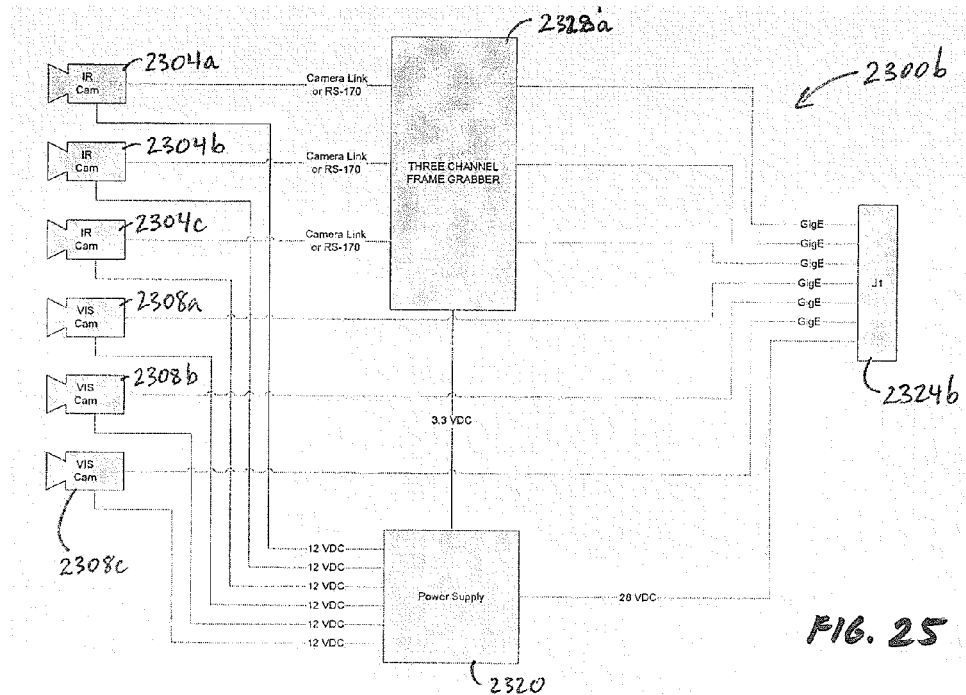

FIG. 25 depicts a schematic of an alternate embodiment of a six-camera sensor pod 2300b having three sets of first and second imaging sensors for capturing images for three slices. Sensor pod 2300b is similar in some respects to sensor pod 2300a of FIG. 24, and the differences will therefore be primarily described here. Sensor pod 2300b comprises a frame grabber 2328a having three channels and configured to "grab" and output images from each IR imaging sensor 2304a (e.g., via three GigE vision cables to connector 2324), and the Vis sensors are coupled directly to connector 2324b (e.g., via three GigE Vision cables), such that warping, stitching, and fusing can be completed remotely from the sensor pod.

Figure 26:
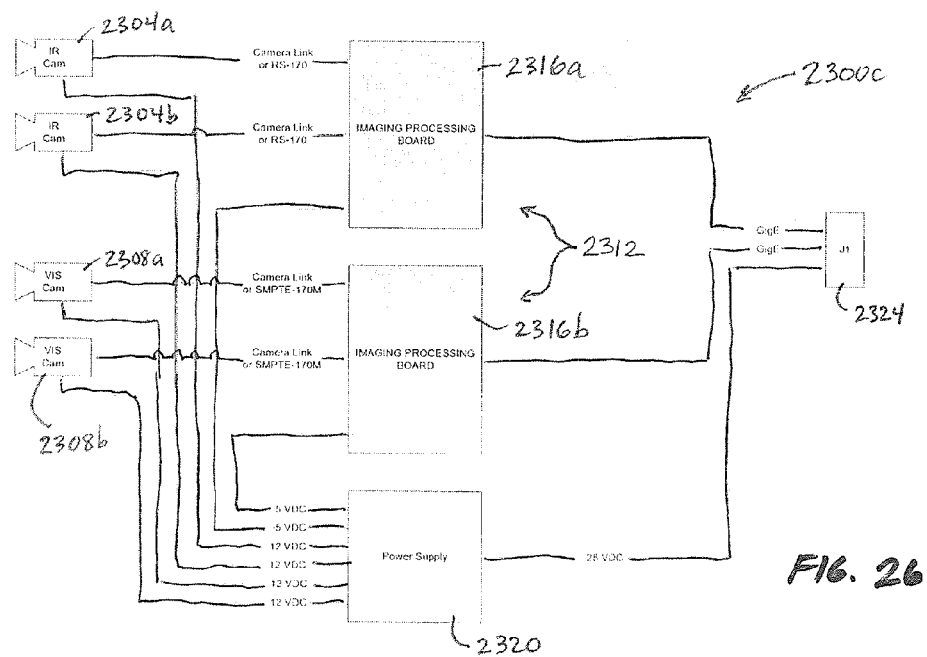

FIG. 26 depicts a schematic of an alternate embodiment of a four-camera sensor pod 2300c. Sensor pod 2300c is similar in some respects to sensor pod 2300 of FIG. 23, and the differences will therefore be primarily described here. Sensor pod 2300c comprises only two sets of first and second imaging sensors. Stated another way, IR sensor 2304c and Vis sensor 2308c are omitted from sensor pod 2300 such that sensor pod 2300c is configured to capture images for only two slices.

Figure 27:
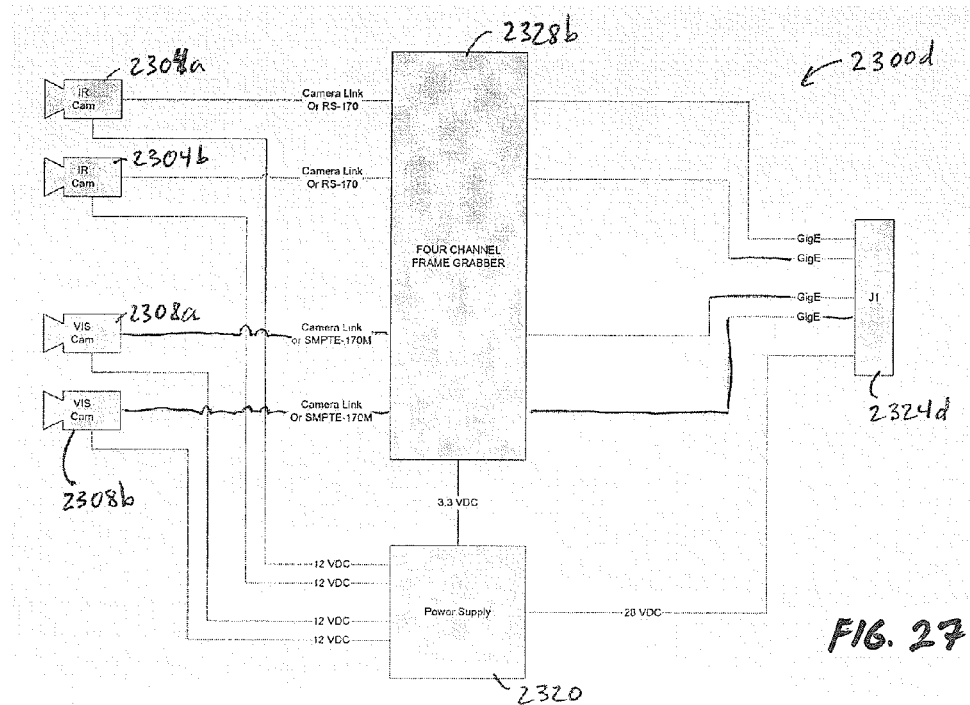

FIG. 27 depicts a schematic of an alternate embodiment of a four-camera sensor pod 2300d. Sensor pod 2300d is similar in some respects to sensor pod 2300a of FIG. 24, and the differences will therefore be primarily described here. Sensor pod 2300d comprises only two sets of first and second imaging sensors. Stated another way, IR sensor 2304c and Vis sensor 2308c are omitted from sensor pod 2300a such that sensor pod 2300d is configured to capture images for only two slices. As such, sensor pod 2300d comprises a frame grabber 2328b that comprises four channels and is coupled to connector 2324d by way of only four GigE Vision cables.

Figure 28:
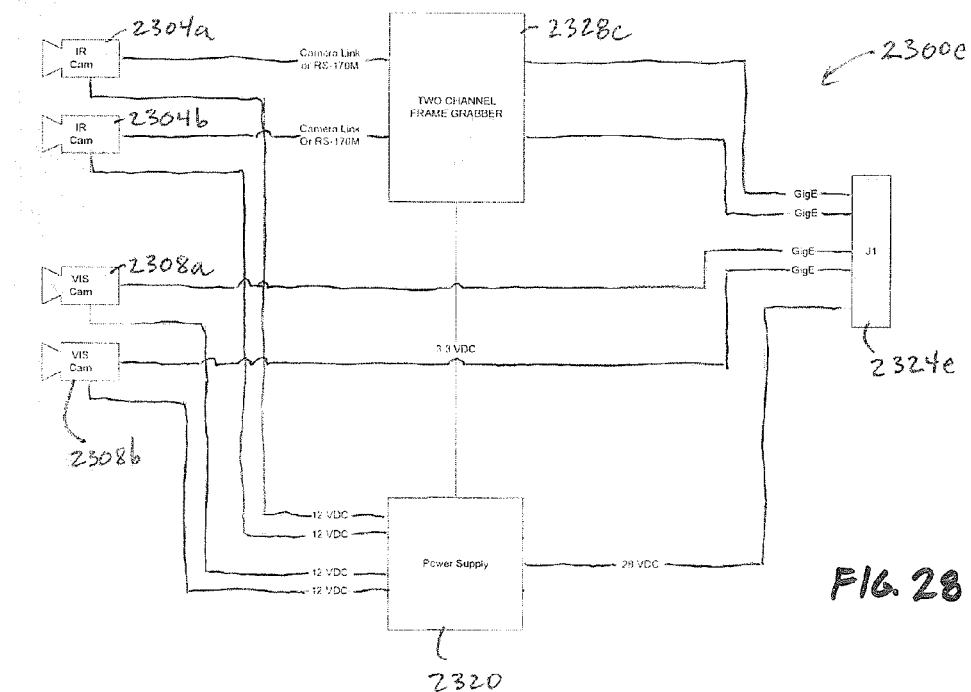

FIG. 28 depicts a schematic of an alternate embodiment of a four-camera sensor pod 2300e. Sensor pod 2300e is similar in some respects to sensor pod 2300b of FIG. 25, and the differences will therefore be primarily described here. Sensor pod 2300e comprises only two sets of first and second imaging sensors. Stated another way, IR sensor 2304c and Vis sensor 2308c are omitted from sensor pod 2300b such that sensor pod 2300e is configured to capture images for only two slices. As such, sensor pod 2300e comprises a frame grabber 2328c that comprises two channels and is coupled to connector 2324e by way of only two GigE Vision cables, while the two Vis imaging sensors are coupled directly to connector 2324e by way of two GigE Vision cables.

Figure 29:
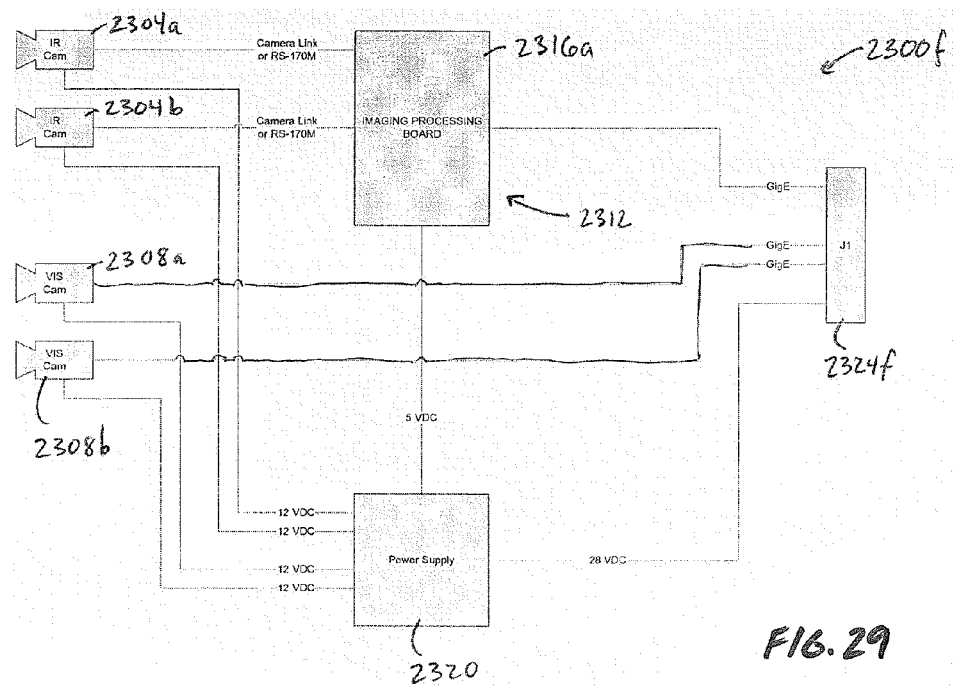

FIG. 29 depicts a schematic of an alternate embodiment of a four-camera sensor pod 230f. Sensor pod 2300f is similar in some respects to sensor pod 2300c of FIG. 26, and the differences will therefore be primarily described here. Sensor pod 2300f comprises only one image processing board 2316a, and the two Vis imaging sensors are coupled directly to connector 2324f by way of two GigE Vision cables.

Experimental Data

A number of tests were performed to determine specifications for various embodiments of imaging sensors and/or other components of the present imaging systems that would achieve results or permit functionality that may desired for such various embodiments. Various embodiments of the present imaging systems include imaging sensors and/or other components that achieve the results and/or permit functionality included in experimental data.

Target detection, recognition and identification (DRI) performance for an imaging system can depend on all elements of its image acquisition, processing, and display components, as well as environmental factors and target attributes. The following experimental data was generated primarily for imaging sensors. The display, processing components, environmental, and target parameters were held constant within these analyses.

An analysis of the CD camera was performed using the Johnson Criteria to estimate system DRI performance, enabling resolution measurements to be converted to probability of detection and detection range. Table 3 includes Johnson Criteria for target detection and recognition showing that the probability of detection, recognition, and identification are highly dependent on the number of resolution elements (pixels) along the minimum dimension of a target.

Table 4 translates the detection level into object dimensions that can be detected with a color-visible camera having a resolution of 1 milliradian/pixel (mrad) and an instantaneous field of view (IFOV) at the specified ranges.

TABLE 3

Johnson Criteria for Target Detection and Recognition
JOHNSON CRITERIA FOR TARGET
DETECTION AND RECOGNITION

| Observer Task | Resolution Elements per Minimum Target Dimension Observer Confidence | |
| --- | --- | --- |
| NVESD Designation | 50% | 95% |
| Detect | 2 | 4 |
| Recognize | 7 | 14 |
| Identify | 13 | 32 |

TABLE 4

Johnson Criteria Minimum Target Dimensions
JOHNSON CRITERIA MINIMUM DETECTABLE TARGET
DIMENSION (M) AS A FUNCTION OF RANGE FOR 1 MRAD PIXELS

| | 300 m | | 500 m | | 1000 m | | 1500 m | |
| --- | --- | --- | --- | --- | --- | --- | --- | --- |
| Pixels at 1 mrad | Pd = 0.5 | Pd = 0.95 | Pd = 0.5 | Pd = 0.95 | Pd = 0.5 | Pd = 0.95 | Pd = 0.5 | Pd = 0.95 |
| Detect | 0.6 m | 1.2 m | 1 m | 2.0 m | 2 m | 4 m | 3 m | 6 m |
| Recognize | 2.1 m | 4.2 m | 3.5 m | 7.0 m | 7.0 m | 14.0 m | 10.5 m | 21 m |
| Identify | 3.9 m | 9.6 m | 6.5 m | 16.0 m | 13.0 m | 32.0 m | 19.5 m | 48 m |

The test data was obtained using the imaging system embodiment depicted in FIG. 1, incorporating color-daylight (CD) cameras and IR cameras. The selected CD cameras provide images that have a resolution of 1 mrad/pixel from elevation angle −20 degrees to +35 degrees. At 300 meters, this resolution results in 2.5 pixels across the minimum dimension (0.75 meters) of the stationary man target. As shown in Table 4, the CD camera has a probability of greater than 50% and less than 95% of detecting the stationary man target. Similarly, the vehicle target dimension of 2.3 meters results in a detection probability of greater than 50% at 1,000 meters.

The IR cameras used were BAE Systems MIM500X MicroIR® LWIR cameras with a 640×480 focal plane array (FPA) and a FOV of 73°×55° were implemented within the IVS. DRI modeling was performed for the LWIR and CD cameras using the NVESD NVThermSep2002 and FSCAM models available from U.S Army RDECOM CERDEC, Night Vision and Electronic Sensors Directorate, Modeling & Simulation Division, Fort Belvoir, Va., U.S.A. (Distribution Limited to US Government Agencies & Their Contractors Only). The MIM500X MicroIR® 640×480 camera with a 73° hFOV lens has a resolution of 2 mrad/pixel. For an FPA of sensitivity <50 mK (Noise Equivalent Temperature Difference), NVThermSep2002 predicts an 80% probability of detecting the standing man target at 270 m (FIG. 30(A)). To accomplish pixel-to-pixel fusion ratios with CD and I² cameras (even though not necessarily fused on a pixel-by-pixel basis), the LWIR camera output was expanded to 1280×960 with the additional pixel values determined by interpolation. This is equivalent to an ×2 digital zoom, and NVThermSep2002 was accordingly run with the ×2 zoom level. DRI modeling is not necessary for implementing embodiments of the present invention, but can be performed with any suitable modeling program or software, such as, for example, a modeling program that takes into account the specific characteristics of imaging sensors.

For the experimental data gathered, the wide field of view image sensors provided 360° azimuth coverage with a ground intercept (distance from sensor at which FOV extends to ground) of less than 5 meters with no blind spots in coverage.

Figure 30:
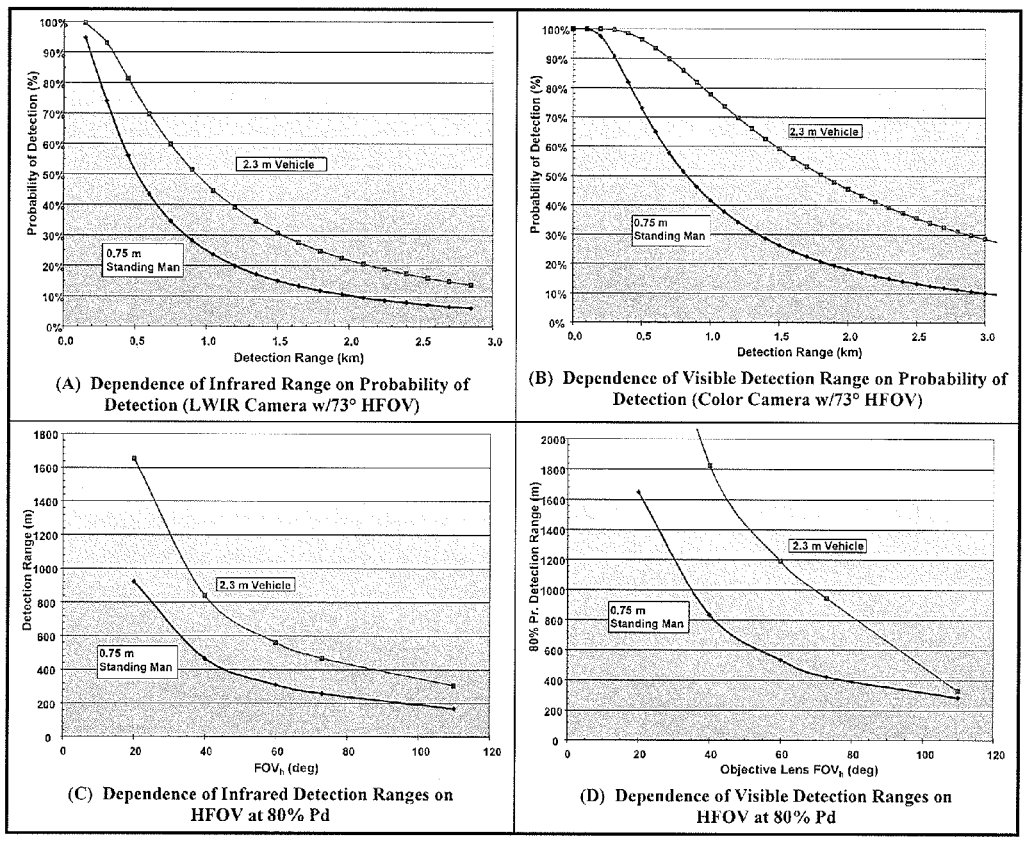
FIGS. 30-33 depict various charts that illustrate experimental data gathered through testing of the embodiment of FIG. 1.
Figure 31:
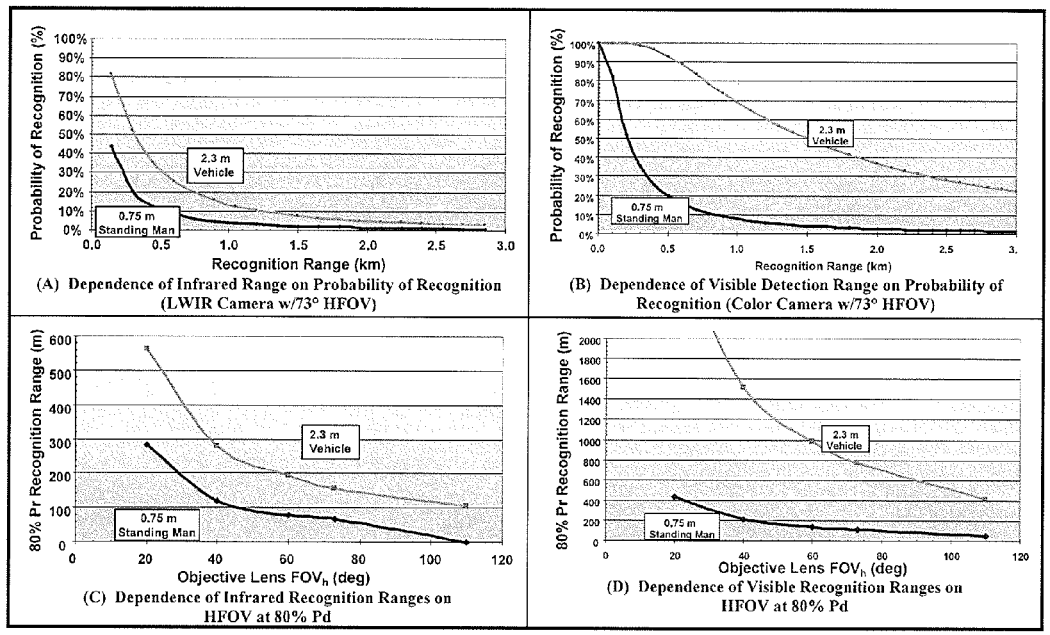
Figure 32:
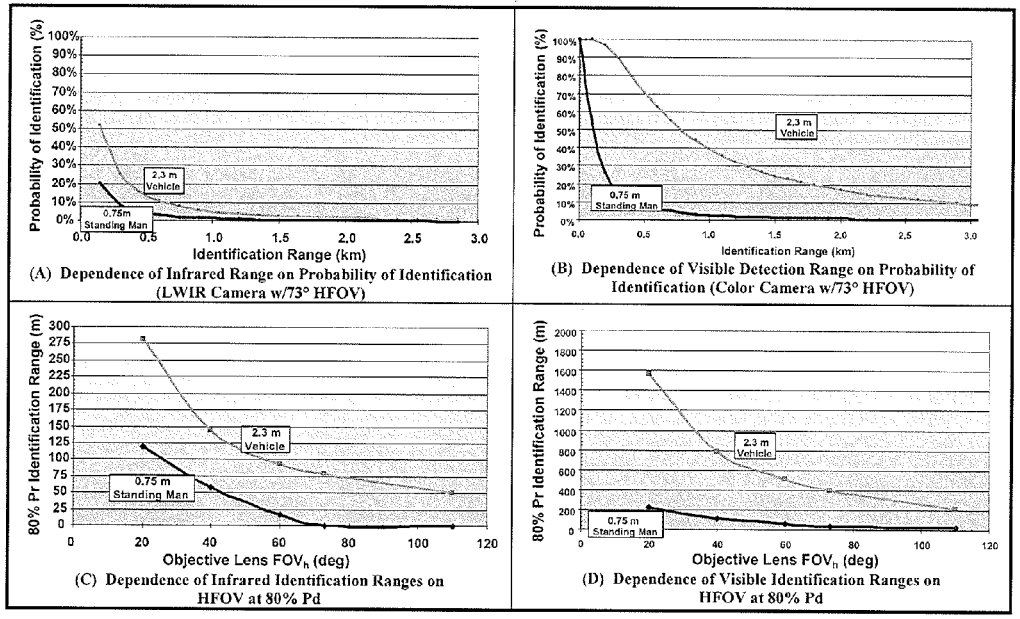
Figure 33:
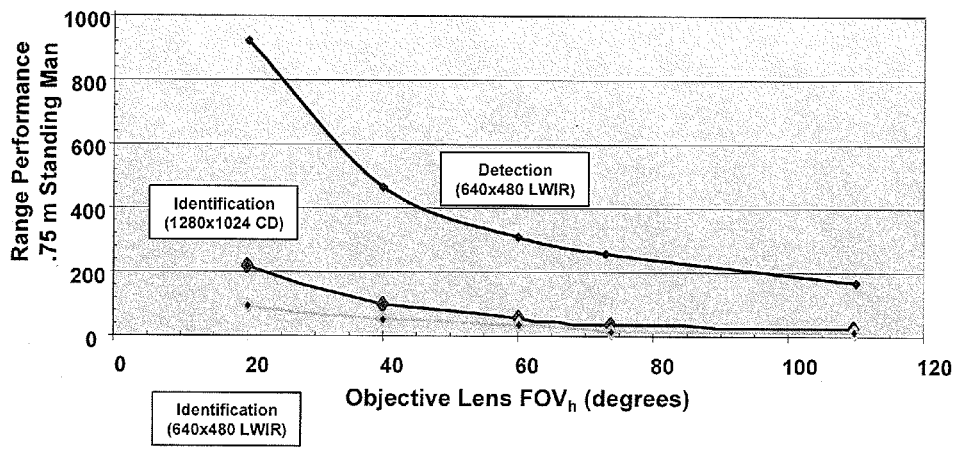

As can be seen in FIGS. 30, 31, and 32, which were generated with the computer models mentioned above, FOV size has a proportional effect on DRI performance. Pd is probability of detection. There is a tradeoff between the FOV of image sensors, sensor resolution, and system field-of-regard corresponding to a given DRI performance requirement. While this configuration resulted in acceptable target detection performance, it proved to be less than desirable from a target identification perspective. In some embodiments of the present imaging systems, sensor DRI performance can be improved by decreasing the FOV size, as illustrated in FIG. 33, of individual imaging sensors while correspondingly increasing the number of sensors; and/or increasing imaging sensor resolution while maintaining the same FOV.

The various illustrative embodiments of devices, systems, and methods described herein are not intended to be limited to the particular forms disclosed. Rather, they include all modifications, equivalents, and alternatives falling within the scope of the claims. For example, in embodiments, such as the ones depicted above, of the present imaging systems, the imaging sensor module could comprise the first imaging sensor and the second imaging sensor, and the display could comprise the image-fusion board, such that images from the first imaging sensor and images from the second imaging sensor could be received and fused at the display rather than at the imaging sensor module.

The claims are not intended to include, and should not be interpreted to include, means-plus- or step-plus-function limitations, unless such a limitation is explicitly recited in a given claim using the phrase(s) "means for" or "step for," respectively.

What is claimed is:

1. An imaging system for a ground vehicle, the imaging system comprising:
   a plurality of first imaging sensors having a first spectrum, each first sensor having a field-of-view (FOV) and configured to be coupled to a vehicle such that the FOV partially overlaps the FOV of at least one of the other first imaging sensors;
   a plurality of second imaging sensors having a second spectrum that is different than the first spectrum, each second sensor having a FOV and configured to be coupled to the vehicle such that the FOV is substantially aligned with the FOV of a corresponding first imaging sensor;

a processing unit configured to receive images from the first and second imaging sensors and to generate an image model in substantially real-time by: warping images from corresponding first and second imaging sensors; fusing images from corresponding first and second imaging sensors; and stitching images from imaging sensors with partially overlapping FOVs; and where the processing unit is configured to be coupled to two or more displays such that the two or more displays can simultaneously each show a different portion of the image model, and such that a user can manually calibrate via user inputs to the processing unit at least one of the warping, fusing, or stitching by which the processing unit is configured to generate the image model; and where at least one of the first spectrum and the second spectrum includes: infrared (IR), visible near-infrared (VNIR), image intensified ($I^2$), or color VNIR.

2. The imaging system of claim 1, where the processing unit is configured to generate an image model by fusing images with an alpha-blending algorithm.

3. The imaging system of claim 1, where the processing unit is configured to generate an image model by warping images with one or more predefined warping templates each corresponding to an imaging sensor.

4. The imaging system of claim 1, where the processing unit is configured to generate an image model by fusing images with one or more predefined stitching templates.

5. The imaging system of claim 1, where the first imaging sensors are long-wavelength infrared (LWIR) imaging sensors.

6. The imaging system of claim 1, where the image model comprises images covering at least a continuous 180 degrees around the vehicle.

7. The imaging system of claim 1, where at least one of the first imaging sensors and the second imaging sensors are analog, and where the processing unit is further configured to convert analog images to digital images prior to generating the image model.

8. The imaging system of claim 1, where the imaging system is configured such that, if the processing unit is coupled to a display, the display can simultaneously show two or more different portions of the image model.

9. The imaging system of claim 1, where the imaging system is further configured such that, if the processing unit is coupled to the display, the display can also show a reference indicator indicative of the orientation of the portion of an image model shown on the display relative to the orientation of the vehicle.

10. The imaging system of claim 1, where the processing unit comprises one or more graphics processors.

11. The imaging system of claim 1, where the processing unit is configured to be coupled to two or more user-input devices each corresponding to a different display.

12. The imaging system of claim 1, further comprising:
a wireless communication device coupled to the processing unit and configured to transmit at least a portion of the image model to a remote receiver.

13. The imaging system of claim 5, where the second imaging sensors are color daylight (CD) imaging sensors.

14. The imaging system of claim 6, where the image model comprises images covering a continuous 360 degrees around the vehicle.

15. The imaging system of claim 8, where the imaging system is configured such that, if the processing unit is coupled to a display, the display can simultaneously show a front portion of an image model including images of in front of the vehicle and a mirrored rear portion of an image model including images of behind the vehicle.

16. The imaging system of claim 11, where processing unit is configured to be coupled to at least one user-input device that is integral to a corresponding display.

17. The imaging system of claim 11, where the imaging system is configured such that, if the processing unit is coupled to a display and a corresponding user-input device, a user can adjust, via the user-input device, the intensity of images from the first imaging sensors relative to the intensity of fused images from the second imaging sensors in a portion of the image model shown on the display.

18. The imaging system of claim 12, where the wireless communication device is further configured to receive signals from a remote user-input device.

19. The imaging system of claim 12, where the processing unit is further configured to compress at least a portion of the image model prior to the wireless communication device transmitting the at least a portion of the image model to a remote receiver.

20. The imaging system of claim 15 where the imaging system is configured such that, if the processing unit is coupled to the display, the display can also simultaneously show two side portions of an image model, each side portion including images from a different side of the vehicle.

21. A vehicle comprising:
a ground vehicle; and
an imaging system coupled to the vehicle, the imaging system comprising:
a plurality of first imaging sensors having a first spectrum, each first sensor having a field-of-view (FOV) and coupled to the vehicle such that the FOV partially overlaps the FOV of at least one of the other first imaging sensors;
a plurality of second imaging sensors having a second spectrum that is different than the first spectrum, each second sensor having a FOV and coupled to the vehicle such that the FOV is substantially aligned with the FOV of a corresponding first imaging sensor;
a processing unit configured to receive images from the first and second imaging sensors and to generate an image model in substantially real-time by: warping images from corresponding first and second imaging sensors; fusing images from corresponding first and second imaging sensors; and stitching images from imaging sensors with partially overlapping FOVs; and
two or more displays coupled to the processing unit;
where the imaging system is configured such that the two or more displays can simultaneously each show a different portion of the image model, and such that a user can manually calibrate via user inputs to the processing unit at least one of the warping, fusing, or stitching by which the processing unit is configured to generate the image model; and
where at least one of the first spectrum and the second spectrum includes: infrared (IR), visible near-infrared (VNIR), image intensified ($I^2$), or color VNIR.

22. The vehicle of claim 21, where the ground vehicle is selected from the group consisting of: M1117 Guardian Armored Security Vehicles (ASVs), High Mobility Multipurpose Wheeled Vehicles (Humvee), Family of Medium Tactical Vehicles (FMTV), Light Medium Tactical Vehicles (LMTV), Medium Tactical Vehicles (MTV), Medium Tactical Vehicle Replacements (MTVR), Heavy Expanded Mobility Tactical Trucks (HEMTT), Heavy Equipment Transport Systems (HETS), Palletized Load System (PLS) vehicles, and Bradley Fighting Vehicles.

* * * * *